United States Patent
Kimura et al.

(10) Patent No.: US 12,053,756 B2
(45) Date of Patent: Aug. 6, 2024

(54) WATER ABSORBENT AGENT HAVING WATER-ABSORBENT RESIN AS MAIN COMPONENT AND COMPRISING A SULFUR-CONTAINING REDUCING AGENT

(71) Applicant: NIPPON SHOKUBAI CO., LTD., Osaka (JP)

(72) Inventors: Kazuki Kimura, Himeji (JP); Daisuke Takeda, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 448 days.

(21) Appl. No.: 17/421,947

(22) PCT Filed: Jan. 10, 2020

(86) PCT No.: PCT/JP2020/000646
§ 371 (c)(1),
(2) Date: Jul. 9, 2021

(87) PCT Pub. No.: WO2020/145384
PCT Pub. Date: Jul. 16, 2020

(65) Prior Publication Data
US 2022/0111352 A1    Apr. 14, 2022

(30) Foreign Application Priority Data
Jan. 11, 2019  (JP) .................. 2019-003362

(51) Int. Cl.
*B01J 20/28* (2006.01)
*B01J 20/26* (2006.01)
*B01J 20/30* (2006.01)

(52) U.S. Cl.
CPC ....... *B01J 20/267* (2013.01); *B01J 20/28004* (2013.01); *B01J 20/28016* (2013.01); *B01J 20/28059* (2013.01); *B01J 20/3021* (2013.01); *B01J 20/3085* (2013.01)

(58) Field of Classification Search
CPC ............ B01J 20/28004; B01J 20/28057; B01J 20/28059; B01J 20/28016
See application file for complete search history.

(56) References Cited

U.S. PATENT DOCUMENTS

| | | | |
|---|---|---|---|
| 4,920,202 A | 4/1990 | Irie et al. | |
| 4,929,717 A | 5/1990 | Chmelir | |
| 5,229,488 A | 7/1993 | Nagasuna et al. | |
| 5,981,070 A | 11/1999 | Ishizaki et al. | |
| 6,107,358 A | 8/2000 | Harada et al. | |
| 6,184,433 B1 | 2/2001 | Harada et al. | |
| 6,207,796 B1 | 3/2001 | Dairoku et al. | |
| 6,254,990 B1 | 7/2001 | Ishizaki et al. | |
| 6,284,362 B1 | 9/2001 | Takai et al. | |
| 8,182,916 B2 * | 5/2012 | Kimura ................ | B01J 20/3028 526/89 |
| 2003/0153887 A1 | 8/2003 | Nawata et al. | |
| 2006/0183828 A1 | 8/2006 | Dairoku et al. | |
| 2007/0178786 A1 | 8/2007 | Nawata et al. | |
| 2009/0136736 A1 | 5/2009 | Nawata et al. | |
| 2010/0062252 A1 * | 3/2010 | Kimura .................... | B01J 20/26 525/329.7 |
| 2010/0273647 A1 | 10/2010 | Nawata et al. | |
| 2014/0127510 A1 | 5/2014 | Handa et al. | |
| 2017/0136441 A1 * | 5/2017 | Kobayashi ........... | B01J 20/3085 |
| 2017/0266641 A1 * | 9/2017 | Kim .................... | B01J 20/3021 |
| 2022/0088568 A1 * | 3/2022 | Kimura ............. | B01J 20/28004 |

FOREIGN PATENT DOCUMENTS

| | | |
|---|---|---|
| EP | 0289338 A2 | 11/1988 |
| EP | 0505163 A1 | 9/1992 |
| EP | 0872491 A1 | 10/1998 |
| EP | 0937739 A2 | 8/1999 |
| EP | 1002806 A1 | 5/2000 |
| JP | H10057805 A | 3/1998 |
| JP | 2006-297373 A | 11/2006 |
| JP | 2016-112475 A | 6/2016 |
| WO | 9103497 A1 | 3/1991 |
| WO | 9703114 A1 | 1/1997 |
| WO | 9903577 A1 | 1/1999 |
| WO | 02085959 A1 | 10/2002 |
| WO | 2006/088115 A1 | 8/2006 |
| WO | 2011/040530 A1 | 4/2011 |
| WO | 2013/002387 A1 | 1/2013 |
| WO | 2013018571 A1 | 2/2013 |
| WO | 2015/053372 A1 | 4/2015 |

OTHER PUBLICATIONS

International Search Report dated Mar. 10, 2020, which issued in the corresponding PCT Patent Application No. PCT/JP2020/000646, including English Translation.

* cited by examiner

Primary Examiner — Hoa (Holly) Le
(74) Attorney, Agent, or Firm — Dickinson Wright PLLC

(57) ABSTRACT

The present invention provides a water absorbent agent that achieves both improvement in the water absorption time thereof and reduction in the residual monomer variation rate thereof. A present inventive method for producing a water absorbent agent having a water-absorbent resin as a main component, the method including a surface-crosslinking step for a water-absorbent resin and a mixing step for a sulfur-containing reducing agent aqueous solution, the method satisfies (1) a specific surface area of the water-absorbent resin, (2) an average droplet diameter of the sulfur-containing reducing agent aqueous solution, and a temperature of the aqueous solution, (3) stirring-mixing conditions, and (4) a heating and drying step conditions.

9 Claims, No Drawings

WATER ABSORBENT AGENT HAVING WATER-ABSORBENT RESIN AS MAIN COMPONENT AND COMPRISING A SULFUR-CONTAINING REDUCING AGENT

TECHNICAL FIELD

The present invention relates to a water absorbent agent having a water-absorbent resin as a main component, and a method for producing the same.

BACKGROUND ART

Water absorbent agents made by using water-absorbent resins are widely used for hygienic materials such as disposable diapers, sanitary napkins, and so-called incontinence pads for the purpose of absorbing body fluids. As the water-absorbent resins, crosslinked products of substances resulting from partially neutralizing polyacrylic acid and the like are known. Not only the above water absorbent agents need to have excellent water absorption properties such as an absorption capacity under no load and an absorption capacity under load, but also problems in terms of hygiene and odor need to be considered in the case where the water absorbent agents are used for hygienic materials. Examples of causes of inflicting influence on the problems in terms of hygiene and odor include small amounts of unreacted monomers that are residual in water-absorbent resins (hereinafter, referred to as "residual monomers"). Thus, various technologies to remove such residual monomers have been proposed.

Examples of methods having been proposed to date include: a method in which an aqueous solution containing a sulfur-containing reducing agent is added by being sprayed on a post-surface-crosslinking water-absorbent resin, and then heating is performed (Patent Literature 1); a method in which a chelating agent and an inorganic reducing agent are added to a water-absorbent resin (Patent Literature 2); methods in each of which a mixing aid such as a surfactant or an inorganic powder is used at the time of adding a reducing agent to a water-absorbent resin (Patent Literatures 3 and 4); a method in which an additive such as hydroxylamine or sulfite with which a residual monomer is reacted is mixed with a hydrous gel (Patent Literature 5); and methods in each of which a residual monomer is reduced under a specific drying condition (Patent Literatures 6 and 7).

Meanwhile, requirement of a water absorption time as a physical property required for water-absorbent resins in addition to an absorption capacity under no load, an absorption capacity under load, and a physical property regarding a residual monomer has also been intensified. Considering this, water-absorbent resins having increased specific surface areas in order to shorten the water absorption times thereof have been disclosed in recent years (Patent Literatures 8 to 13). In addition, a water-absorbent resin having a high specific surface area for blood absorption has also been disclosed (Patent Literature 14).

CITATION LIST

Patent Literature

[PTL 1] International Publication No. 2006/088115
[PTL 2] International Publication No. 2011/040530
[PTL 3] European Patent Application Publication No. 0505163
[PTL 4] International Publication No. 91/023997
[PTL 5] U.S. Pat. No. 4,929,717
[PTL 6] European Patent Application Publication No. 0289338
[PTL 7] European Patent Application Publication No. 1002806
[PTL 8] International Publication No. 97/03114
[PTL 9] Japanese Laid-Open Patent Publication No. H10-057805
[PTL 10] European Patent Application Publication No. 0872491
[PTL 11] European Patent Application Publication No. 0937739
[PTL 12] International Publication No. 99/03577
[PTL 13] International Publication No. 2013/018571
[PTL 14] International Publication No. 02/085959

SUMMARY OF THE INVENTION

Problems to be Solved by the Invention

The water-absorbent resins having increased specific surface areas for the purpose of shortening the water absorption times thereof have been proposed in recent years (Patent Literatures 8 to 14). Meanwhile, the present inventors conducted studies regarding use of the sulfur-containing reducing agents described in Patent Literatures 1 to 5 in order to reduce a residual monomer content of a water-absorbent resin having a high specific surface area. As a result, the present inventors found the following problems. That is, if an aqueous solution of any of the sulfur-containing reducing agents is added under a conventional adding condition, a large amount of aggregates of the water-absorbent resin are generated, and furthermore, variation in the residual monomer content among particle diameters (hereinafter, sometimes referred to as "among particle sizes") increases, or the majority of the sulfur-containing reducing agent having been added is taken into the aggregates so that the sulfur-containing reducing agent is not taken into a final product.

In addition, the present inventors also found that an effect of reducing the residual monomer content under the drying conditions disclosed in Patent Literatures 6 and 7 is low for the water-absorbent resin having a high specific surface area.

Further, if variation in the residual monomer content increases in this manner, there is the following concern. That is, in the case where particle size-based segregation of the water absorbent agent occurs in a manufacturing line for hygienic materials (hereinafter, referred to as "absorbent articles") such as disposable diapers, only a water absorbent agent having a high residual monomer content may be provided in an absorbent article, whereby problems arise in terms of hygiene and odor.

In view of the above, the present invention provides a water absorbent agent that achieves both improvement in the water absorption time thereof and reduction in the residual monomer variation rate thereof, and further provides a water absorbent agent that has a short water absorption time and a low residual monomer content and that is prone to less variation in the residual monomer content among particles.

Solution to Problem

A present invention, which can solve the above problem, has the following configuration:

[1] A method for producing a water absorbent agent having a water-absorbent resin as a main component, the method including a surface-crosslinking step for a water-absorbent resin and a mixing step for a sulfur-containing reducing agent aqueous solution, the method comprising:

the method satisfies following (1) to (4):
(1) a specific surface area of the water-absorbent resin is not lower than 25 m²/kg;
(2) an average droplet diameter of the sulfur-containing reducing agent aqueous solution is not larger than 2.5 mm, and a temperature of the aqueous solution is not higher than 80° C.;
(3) stirring-mixing is performed in the mixing step so as to satisfy the following expression (a), stirring force coefficient≥0.16×(average droplet diameter (mm))+0.05    (a), where the stirring force coefficient is defined by (Froude number Fr)×(gravitational acceleration g); and
(4) a heating and drying step is performed at not lower than 40° C. and not higher than 150° C. after the mixing step.

[2] The method for producing according to [1], wherein
a temperature of the water-absorbent resin at the time of adding the sulfur-containing reducing agent aqueous solution in the mixing step is not higher than 150° C.

[3] The method for producing according to [1] or [2], wherein
a form of the water-absorbent resin is an indefinite pulverized form.

[4] The method for producing according to any one of [1] to [3], wherein
a mass-average particle diameter D50 of the water-absorbent resin is not smaller than 250 μm and smaller than 550 μm, and
a proportion of water-absorbent resin particles contained in the water-absorbent resin of particle diameters smaller than 150 μm is lower than 3% by mass.

[5] The method for producing according to any one of [1] to [4], wherein
the water-absorbent resin is obtained by foaming polymerization of an unsaturated monomer aqueous solution.

[6] The method for producing according to any one of [1] to [5], wherein
the sulfur-containing reducing agent is a water-soluble salt in which all acid groups have been neutralized.

[7] The method for producing according to any one of [1] to [6], wherein
the surface-crosslinking agent is added in the form of a solution to the water-absorbent resin, and
a concentration of the surface-crosslinking agent in the surface-crosslinking agent solution is not lower than 0.1% by mass and not higher than 60% by mass.

[8] The method for producing according to any one of [1] to [7], wherein
an addition amount of the sulfur-containing reducing agent aqueous solution per 100 parts by mass of the water-absorbent resin is not lower than 0.1 parts by mass and not higher than 5 parts by mass.

[9] The method for producing according to any one of [1] to [8], wherein
a concentration of the sulfur-containing reducing agent aqueous solution is not lower than 0.1% by mass and not higher than 50% by mass.

[10] The method for producing according to any one of [1] to [9], wherein
the method further includes a step of retaining an obtained water absorbent agent in a storing tank after the heating and drying step, wherein
the obtained water absorbent agent is retaining in the storing tank for not shorter than 1 minute and not longer than 20 hours.

[11] The method for producing according to [10], wherein
the method further includes a step of filling a product shipping container with the water absorbent agent after the step of retaining the water absorbent agent in the storing tank.

[12] A water absorbent agent containing a sulfur-containing reducing agent and containing a water-absorbent resin as a main component, wherein
the water absorbent agent includes a particle of the water absorbent agent having a particle diameter smaller than 300 μm, a particle of the water absorbent agent having a particle diameter not smaller than 300 μm and smaller than 500 μm, and a particle of the water absorbent agent having a particle diameter not smaller than 500 μm;
the water absorbent agent has a specific surface area not lower than 25 m²/kg;
the water absorbent agent has a sulfur-containing reducing agent dispersity not larger than 28, the sulfur-containing reducing agent dispersity being defined in the following expression (b).

(Sulfur-containing reducing agent dispersity)=σ1/(sulfur-containing reducing agent content of water absorbent agent)×100.    (b)

here, a particle size distribution is defined by a sieve classification
σ1: a standard deviation among the following A1, A2, and A3,
A1: a sulfur-containing reducing agent content (unit: % by mass) of the particle that are not smaller than 500 μm out of the particles forming the water absorbent agent,
A2: a sulfur-containing reducing agent content (unit: % by mass) of the particle that is not smaller than 300 μm and smaller than 500 μm out of the particles forming the water absorbent agent, and
A3: a sulfur-containing reducing agent content (unit: % by mass) of the particle that is smaller than 300 μm out of the particles forming the water absorbent agent.

[13] The water absorbent agent according to [12], wherein
the form of the water absorbent agent is an indefinite pulverized form.

[14] The water absorbent agent according to [12] or [13], wherein
a content of the sulfur-containing reducing agent of the water absorbent agent is higher than 0% by mass and not higher than 1% by mass.

[15] The water absorbent agent according to any one of [12] to [14], wherein
a content of a residual monomer of the water absorbent agent with respect to the entire amount of the water absorbent agent is not higher than 500 ppm.

[16] The water absorbent agent according to any one of [12] to [15], wherein
a Vortex-method-based water absorption time of the water absorbent agent is longer than 10 seconds and not longer than 45 seconds.

[17] The water absorbent agent according to any one of [12] to [16], wherein
the water absorbent agent has not lower than 20 g/g of the absorption capacity under load AAP under a load of 4.83 kPa.
[18] The water absorbent agent according to any one of [12] to [17], wherein
a moisture content of the water absorbent agent is higher than 0% by mass and not higher than 10% by mass.
[19] The water absorbent agent according to any one of [12] to [18], wherein
a residual monomer variation rate of the water absorbent agent is not larger than 20 defined by the following expression (c).

(Residual monomer variation rate)=σ2/(residual monomer content of water absorbent agent)× 100  expression (c)

here,
σ2: a standard deviation among the following B1, B2, and B3,
B1: a residual monomer content (unit: ppm) of the particle that are not smaller than 500 μm out of the particles forming the water absorbent agent,
B2: a residual monomer content (unit: ppm) of the particle that are smaller than 500 μm and not smaller than 300 μm out of the particles forming the water absorbent agent, and
B3: a residual monomer content (unit: ppm) of the particle that are smaller than 300 μm out of the particles forming the water absorbent agent.
[20] The water absorbent agent according to any one of [12] to [19], wherein
a mass-average particle diameter D50 of the water absorbent agent is not smaller than 250 μm and not larger than 550 μm; and
a proportion of the particles smaller than 150 μm is not higher than 3% by mass.

Advantageous Effects of the Invention

The producing method according to the present invention makes it possible to reduce, in a water-absorbent resin having a high specific surface area, variation in a residual monomer content among particles represented by a residual monomer variation rate and variation in a sulfur-containing reducing agent represented by a sulfur-containing reducing agent dispersity.

Therefore, the producing method according to the present invention makes it possible to provide a water absorbent agent having a short water absorption time and furthermore a low residual monomer variation rate. Further, by reduction in the residual monomer variation rate, even if particle size-based segregation of the water absorbent agent occurs in a manufacturing line for absorbent articles, the residual monomer content is less likely to vary among water absorbent agents provided in respective absorbent articles. Accordingly, the problems in terms of hygiene and odor can be lessened.

DESCRIPTION OF EMBODIMENTS

As a result of studies by the present inventors, it has been found that increase in the specific surface area of a water-absorbent resin tends to lead to increase in a residual monomer content thereof. The residual monomer content of a conventional water-absorbent resin is reduced by pulverizing and then sufficiently drying a polymerized hydrous gel. However, it has been found that, if the hydrous gel is pulverized so as to increase the specific surface area thereof and then is dried, the drying speed is increased and water in the hydrous gel can be reduced in a short time, but a reaction time for polymerizing a residual monomer in the hydrous gel with use of a polymerization initiator cannot be ensured owing to influence of shortening of the drying time so that the residual monomer content cannot be sufficiently reduced.

Therefore, studies were conducted to make an attempt to reduce the residual monomer content by a method excluding drying treatment in the case of increasing the specific surface area of a water-absorbent resin. First, studies were conducted regarding addition of a sulfur-containing reducing agent aqueous solution known as an additive that was effective in reduction in the residual monomer content. However, it was found that conventional methods for the addition posed the following problems.

If a sulfur-containing reducing agent aqueous solution is heated at a high temperature exceeding 150° C., odor is generated owing to sulfur oxide. For example, if a sulfur-containing reducing agent aqueous solution is added to a hydrous gel, odor is generated owing to heating in a step of drying the hydrous gel. Further, for example, if a sulfur-containing reducing agent aqueous solution is added together with a surface-crosslinking agent or prior to addition of the surface-crosslinking agent at the time of performing surface-crosslinking treatment on a base polymer having been dried, odor is generated by heating that is performed in the surface-crosslinking treatment. Thus, addition of a sulfur-containing reducing agent aqueous solution before heating is difficult in a manufacturing process for a water-absorbent resin.

Meanwhile, studies were conducted regarding addition of a sulfur-containing reducing agent aqueous solution to a water-absorbent resin having been subjected to high-temperature treatment, e.g., a surface-crosslinked water-absorbent resin. However, the sulfur-containing reducing agent aqueous solution was quickly absorbed owing to an increased specific surface area, and the absorption amount of the sulfur-containing reducing agent aqueous solution differed according to particle diameters of the water-absorbent resin. Thus, even mixing was difficult to perform, and significant variation in the residual monomer content occurred among the particle sizes of the water-absorbent resin. Further, regarding the above water-absorbent resin having an increased specific surface area, mutual binding in the surface-crosslinked water-absorbent resin easily occurred owing to the difference in the absorption amount of the sulfur-containing reducing agent aqueous solution, whereby a problem arose in that, for example, coarse particles resulting from aggregation of the surface-crosslinked water-absorbent resin (hereinafter, sometimes referred to as "aggregated coarse particles") were easily generated at the time of adding and mixing the sulfur-containing reducing agent aqueous solution. Therefore, although addition of the sulfur-containing reducing agent aqueous solution was effective in reducing the residual monomer content, it was difficult to achieve both increase in the specific surface area of the water-absorbent resin and reduction in variation in the residual monomer content among particle sizes.

As a result of earnest studies, the present inventors have found that generation of odor due to decomposition of a sulfur-containing reducing agent is suppressed if a heating temperature does not exceed 150° C. in a heating and drying step after a pre-surface-crosslinking water-absorbent resin and a sulfur-containing reducing agent aqueous solution are mixed with each other. In addition, the present inventors have found that generation of the above odor is suppressed if a heating temperature is not higher than 150° C. in a heating and drying step after a post-surface-crosslinking water-absorbent resin and the sulfur-containing reducing agent aqueous solution are mixed with each other. With these findings, the present inventors have found that both increase in the specific surface area of the water-absorbent resin and reduction in variation in the residual monomer content among particle sizes can be achieved if, when the sulfur-containing reducing agent aqueous solution is added to the water-absorbent resin having a high specific surface area, an average droplet diameter, the temperature of the aqueous solution, and a condition of stirring-mixing between the sulfur-containing reducing agent aqueous solution and the water-absorbent resin are optimized. Thus, the present inventors arrived at the present invention.

Hereinafter, a method for producing a water absorbent agent of the present invention will be described in detail. However, the scope of the present invention is not limited to this description, and the present invention can be carried out with appropriate modifications which are not exemplified below, without departing from the gist of the present invention. Specifically, the present invention is not limited to the following embodiments, various modifications can be made within the scope of the claims, and embodiments obtained by combining, as appropriate, technical means disclosed in different embodiments are also encompassed in the technical scope of the present invention.

[1] DEFINITION OF TERMS

[1-1] Water-Absorbent Resin and Water Absorbent Agent

The "water-absorbent resin" in the present specification means a water-swelling and water-insoluble macromolecular gelling agent. The gelling agent is generally in a powder form. The term "water-swelling" means a feature in which an absorption capacity under no load (hereinafter, sometimes written as "CRC") defined in WSP241.3(10) is not lower than 5 g/g. The term "water-insoluble" means a feature in which a soluble content (hereinafter, sometimes written as "Ext") defined in WSP270.3(10) is not higher than 50% by mass.

Although the above "water-absorbent resin" is preferably a hydrophilic crosslinked polymer obtained by crosslinking and polymerizing an unsaturated monomer having a carboxyl group, the water-absorbent resin does not need to be a crosslinked polymer over the entire amount, i.e., 100% by mass, thereof and may contain an additive and the like within a range that allows performances such as the above CRC and Ext to be satisfied.

In addition, the above "water-absorbent resin" may refer to a "polymer of which only the inside is crosslinked, i.e., a polymer of which the inside and the surface have approximately equal crosslink densities" or a "polymer of which the inside and the surface are crosslinked, i.e., a polymer having a relatively higher crosslink density on the surface thereof than on the inside thereof".

In the present specification, the above "polymer of which only the inside is crosslinked" and the above "polymer of which the inside and the surface are crosslinked", are not distinguished from each other in principle and are each written as a "water-absorbent resin". However, if clear distinguishment needs to be made as to presence/absence of surface-crosslinks, the above "polymer of which only the inside is crosslinked" is written as a "pre-surface-crosslinking water-absorbent resin" since surface-crosslinking has not yet been performed, and the above "polymer of which the inside and the surface are crosslinked" is written as a "post-surface-crosslinking water-absorbent resin" since surface-crosslinking has already been performed. The term "pre-surface-crosslinking" means "before addition of a surface-crosslinking agent" or "after addition of a surface-crosslinking agent but before the start of a crosslinking reaction by heating".

The above "water-absorbent resin" may refer only to a resin component but may contain a component other than resin, such as an additive.

The "water absorbent agent" in the present specification means a water absorbent agent in which the above "water-absorbent resin" and a "sulfur-containing reducing agent" have been mixed with each other (hereinafter, sometimes written as a "water-absorbent resin composition"). Therefore, the above "water absorbent agent" encompasses both: a water-absorbent resin composition containing a sulfur-containing reducing agent, in a state where the water-absorbent resin composition can be directly shipped as a final product; and a water-absorbent resin composition containing a sulfur-containing reducing agent, in a state where the water-absorbent resin composition has been further subjected to an optional treatment.

The above "water absorbent agent" contains a water-absorbent resin as a main component. The "main component" means that the mass proportion of the water-absorbent resin to the entire water absorbent agent is preferably not lower than 50% by mass and not lower than 60% by mass, not lower than 70% by mass, not lower than 80% by mass, and not lower than 90% by mass in this order but not higher than 100% by mass. In addition, the above "water absorbent agent" preferably contains, as other components, inorganic acid alkali metal salt powder, water, and a trace component.

[1-2] Polyacrylic Acid (Salt)-Based Water-Absorbent Resin

A "polyacrylic acid (salt)-based water-absorbent resin" in the present specification means a water-absorbent resin formed from a raw material that is acrylic acid and/or a salt thereof (hereinafter, written as "acrylic acid (salt)"). That is, the "polyacrylic acid (salt)-based water-absorbent resin" is a polymer that has a structural unit derived from the acrylic acid (salt) and that contains a graft component as an optional component.

Specifically, the polyacrylic acid (salt)-based water-absorbent resin is a polymer having an acrylic acid (salt) content that is preferably not lower than 50 mol %, more preferably not lower than 70 mol %, and further preferably not lower than 90 mol % and meanwhile, preferably not higher than 100 mol % and more preferably approximately 100 mol % with respect to moieties excluding an internal crosslinking agent out of monomers related to a polymerization reaction.

[1-3] "EDANA" and "WSP"

"EDANA" is an abbreviation for European Disposables and Nonwovens Associations. "WSP" is an abbreviation for Worldwide Strategic Partners and indicates a global standard measurement method for water absorbent agents or water-absorbent resins, which is provided by the EDANA. In the present invention, physical properties of the water absorbent agent or the water-absorbent resin were measured according to the original version of the WSP (revised in 2010), unless otherwise specified. In the present invention, measurement was performed according to methods in the EXAMPLES described below, unless separately otherwise noted.

[1-4] CRC (WSP241.3(10))

"CRC" is an abbreviation for Centrifuge Retention Capacity and means an absorption capacity under no load of the water absorbent agent or the water-absorbent resin. Specifically, "CRC" refers to an absorption capacity (unit: g/g) after 0.2 g of the water absorbent agent or the water-absorbent resin is put into a bag made of a nonwoven fabric, then the bag is immersed in a large excess of a 0.9%-by-mass aqueous solution of sodium chloride for 30 minutes so as to cause the water absorbent agent or the water-absorbent resin to freely swell, and then the water absorbent agent or the water-absorbent resin is dehydrated by using a centrifugal separator (centrifugal force: 250 G).

[1-5] Ext (WSP270.3(10))

"Ext" is an abbreviation for Extractables and means the water-soluble content, i.e., the water-soluble component amount, of the water absorbent agent or the water-absorbent resin. Specifically, "Ext" refers to a dissolved polymer amount (unit: % by mass) after 1.0 g of the water absorbent agent or the water-absorbent resin is added to 200 ml of a 0.9%-by-mass aqueous solution of sodium chloride and the aqueous solution is stirred for 1 hour or 16 hours at 250 rpm. The dissolved polymer amount is measured by using pH titration. The time for the stirring is written at the time of reporting a result.

[1-6] Other Terms

In the present specification, the term " . . . acid (salt)" means " . . . acid and/or a salt thereof", and the term "(meth)acrylic" means "acrylic and/or methacrylic".

[2] METHOD FOR PRODUCING WATER ABSORBENT AGENT

The water absorbent agent according to the present invention is a water-absorbent resin composition that contains a polyacrylic acid (salt)-based water-absorbent resin and a sulfur-containing reducing agent. Hereinafter, a method for producing the above water-absorbent resin will be described in detail.

[2-1] Monomer Aqueous Solution Preparation Step

The present step is a step of preparing a monomer aqueous solution that contains: a monomer that contains acrylic acid (salt) as a main component; and one or more types of polymerizable internal crosslinking agents. The above "main component" means that the amount of the acrylic acid (salt) contained with respect to the moieties excluding each internal crosslinking agent in the monomer used for a polymerization reaction is not lower than 50 mol %, preferably not lower than 70 mol %, and more preferably not lower than 90 mol %, and meanwhile, the amount is preferably not higher than 100 mol %. Although a monomer slurry liquid can also be used within a range that does not influence the water absorption performance of the water absorbent agent obtained as a final product, a monomer aqueous solution will be described for convenience in the present specification.

[2-1-1] Acrylic Acid (Salt)

In the present invention, a known acrylic acid (salt) is preferably used as a monomer (hereinafter, sometimes referred to as a "polymerizable monomer") from the viewpoint of physical properties of and productivity for the water absorbent agent or the water-absorbent resin. The known acrylic acid contains small amounts of components such as a polymerization inhibitor and impurities.

As the above polymerization inhibitor, a methoxyphenol is preferably used, and a p-methoxyphenol is more preferably used. The concentration of the polymerization inhibitor in the acrylic acid is, on a mass basis, preferably not lower than 10 ppm and more preferably not lower than 20 ppm, and meanwhile, the concentration is preferably not higher than 200 ppm, more preferably not higher than 160 ppm, and further preferably not higher than 100 ppm, from the viewpoint of the polymerizability of the acrylic acid, the color tone of the water absorbent agent or the water-absorbent resin, and the like.

Examples of the above impurities include compounds described in US Patent Application Publication No. 2008/0161512 as well as organic compounds such as acetic acid, propionic acid, and furfural.

Examples of the acrylic acid salt include salts obtained by neutralizing the above acrylic acid with the following basic compound. The acrylic acid salt may be a commercially available acrylic acid salt or may be a salt obtained by neutralizing the acrylic acid.

[2-1-2] Basic Compound

The "basic compound" in the present invention means a compound exhibiting basicity. Specifically, examples of the basic compound include sodium hydroxide and the like. Commercially available sodium hydroxides contain heavy metals such as zinc, lead, and iron in a ppm order (on a mass basis), and thus, strictly speaking, the sodium hydroxides can also be expressed as compositions. In the present invention, such compositions are also regarded as being encompassed in a range of basic compounds.

Specific examples of the above basic compound include carbonates and bicarbonates of alkali metals, hydroxides of alkali metals, ammonia, organic amines, and the like. Among these basic compounds, a strongly basic compound is selected from the viewpoint of the water absorption performance of the water absorbent agent or the water-absorbent resin. Therefore, a hydroxide of an alkali metal such as sodium, potassium, or lithium is preferable, and sodium hydroxide is more preferable. The basic compound is preferably made into an aqueous solution from the viewpoint of handleability.

[2-1-3] Neutralization

In the case where a salt obtained by neutralizing the acrylic acid is used as the above acrylic acid salt, the timing of performing neutralization may be any of a timing before polymerization, a timing during polymerization, and a timing after polymerization, and neutralization may be performed at a plurality of timings or locations. Further, neutralization is preferably performed in a continuous manner from the viewpoint of production efficiency for the water absorbent agent or the water-absorbent resin.

In the case of using an acrylic acid (salt) in the present invention, the neutralization ratio thereof with respect to the acid group of the monomer is preferably not lower than 10 mol %, more preferably not lower than 40 mol %, further preferably not lower than 50 mol %, and particularly preferably not lower than 60 mol %, and meanwhile, the neutralization ratio is preferably not higher than 90 mol %, more preferably not higher than 85 mol %, further preferably not higher than 80 mol %, and particularly preferably not higher than 75 mol %. If the neutralization ratio is set to fall within the range, it becomes easier to suppress reduction in the water absorption performance of the water absorbent agent or the water-absorbent resin.

The above range of the neutralization ratio is applied to neutralization at any of the above timings, i.e., a timing before polymerization, a timing during polymerization, and a timing after polymerization. In addition, the range is applied not only to the acid group of the water-absorbent resin but also to the acid group of the water absorbent agent as a final product in the same manner.

[2-1-4] Another Monomer

In the present invention, a monomer other than the above acrylic acid (salt) (hereinafter, written as "another monomer") may be used in combination with the acrylic acid (salt), as necessary.

Specific examples of the above other monomer include: anionic unsaturated monomers and salts thereof such as maleic acid, maleic anhydride, itaconic acid, cinnamic acid, vinylsulfonic acid, allyltoluenesulfonic acid, vinyltoluenesulfonic acid, styrenesulfonic acid, 2-(meth)acrylamide-2-methylpropane sulfonic acid, 2-(meth)acryloylethanesulfonic acid, 2-(meth)acryloylpropanesulfonic acid, and 2-hydroxyethyl(meth)acryloyl phosphate; unsaturated monomers that contain mercaptan groups; unsaturated monomers that contain phenolic hydroxyl groups; unsaturated monomers that contain amide groups, such as (meth)acrylamide, N-ethyl(meth)acrylamide, and N,N-dimethyl (meth)acrylamide; and unsaturated monomers that contain amino groups, such as N,N-dimethylaminoethyl(meth)acrylate, N,N-dimethylaminopropyl (meth)acrylate, and N,N-dimethylaminopropyl(meth)acrylamide. The other monomer contains a water-soluble or hydrophobic unsaturated monomer. In the case of using the other monomer, the use amount thereof with respect to the monomer excluding the internal crosslinking agent is preferably not higher than 30 mol %, more preferably not higher than 10 mol %, and further preferably not higher than 5 mol %.

[2-1-5] Internal Crosslinking Agent

In a preferable producing method in the present invention, an internal crosslinking agent is used. Specific examples of the internal crosslinking agent include N,N'-methylene bis (meth)acrylamide, (poly)ethylene glycol di(meth)acrylate, (poly)propylene glycol di(meth)acrylate, trimethylolpropane di(meth)acrylate, trimethylolpropane tri(meth)acrylate, glycerin tri(meth)acrylate, glycerin acrylate methacrylate, ethylene oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxy alkane, (poly)ethylene glycol diglycidyl ether, glycerol diglycidyl ether, ethylene glycol, polyethylene glycol, propylene glycol, glycerin, pentaerythritol, ethylenediamine, polyethyleneimine, glycidyl (meth)acrylate, and the like. Among these internal crosslinking agents, one or more types of internal crosslinking agents are selected in consideration of reactivity and the like. From the viewpoint of the water absorption performance of the water absorbent agent or the water-absorbent resin and the like, an internal crosslinking agent having two or more polymerizable unsaturated groups is preferably selected, an internal crosslinking agent having pyrolytic property at a drying temperature described later is more preferably selected, and an internal crosslinking agent having two or more polymerizable unsaturated groups and having a (poly)alkylene glycol structure is further preferably selected.

Specific examples of the above polymerizable unsaturated groups include an allyl group and a (meth)acrylate group. Out of these polymerizable unsaturated groups, a (meth) acrylate group is preferable. Specific examples of the above internal crosslinking agent having a (poly)alkylene glycol structure include polyethylene glycol. The number (hereinafter, sometimes written as "n") of alkylene glycol units is preferably not smaller than 1 and more preferably not smaller than 6, and meanwhile, the number is preferably not larger than 100, more preferably not larger than 50, further preferably not larger than 20, and particularly preferably not larger than 10.

The use amount of the above internal crosslinking agent with respect to the monomer excluding the internal crosslinking agent is preferably not lower than 0.0001 mol %, more preferably not lower than 0.001 mol %, and further preferably not lower than 0.01 mol %, and meanwhile, the use amount is preferably not higher than 10 mol %, more preferably not higher than 5 mol %, and further preferably not higher than 1 mol %. If the use amount is set to fall within the range, it becomes easier to obtain a water absorbent agent or a water-absorbent resin having desired water absorption performance. Meanwhile, if the use amount is outside the range, reduction in an absorption capacity or increase in the water-soluble content due to reduction in a gel strength may be observed.

The above internal crosslinking agent is preferably added in advance at the time of preparing the monomer aqueous solution. In this case, a crosslinking reaction occurs simultaneously with a polymerization reaction. Meanwhile, a polymerization reaction may be started without adding the internal crosslinking agent, and the internal crosslinking agent may be added during the polymerization reaction or after the polymerization reaction, to cause a crosslinking reaction. These methods may be employed in combination. Alternatively, self-crosslinking may be caused without using the internal crosslinking agent.

[2-1-6] Substance to be Added to Monomer Aqueous Solution

In the present invention, when the above monomer aqueous solution is prepared, the following substance may be added to the monomer aqueous solution at one or more timings out of a timing during the above polymerization reaction and crosslinking reaction or a timing after the above polymerization reaction and crosslinking reaction from the viewpoint of improvement in the physical properties of the water absorbent agent or the water-absorbent resin.

Specific examples of the substance include: hydrophilic macromolecules such as starch, starch derivatives, cellulose, cellulose derivatives, polyvinyl alcohol (hereinafter, sometimes referred to as "PVA"), polyacrylic acid (salt), and crosslinked products of polyacrylic acid (salt); and compounds such as carbonate, azo compounds, various foaming agents for generating bubbles, surfactants, chelating agents, and chain transfer agents.

The addition amount of the above hydrophilic macromolecule with respect to the above monomer aqueous solution is preferably not higher than 50% by mass, more preferably not higher than 20% by mass, further preferably not higher than 10% by mass, and particularly preferably not higher than 5% by mass, and meanwhile, the addition amount is preferably 0% by mass and more preferably higher than 0% by mass. The addition amount of the above compound with respect to the above monomer aqueous solution is preferably not higher than 5% by mass, more preferably not higher than 1% by mass, and further preferably not higher than 0.5% by mass, and meanwhile, the addition amount is preferably not lower than 0% by mass and more preferably higher than 0% by mass.

If a water-soluble resin or a water-absorbent resin is used as the above hydrophilic macromolecule, a graft polymer or water-absorbent resin composition such as a starch-acrylic acid (salt) copolymer and a PVA-acrylic acid (salt) copolymer is obtained. The graft polymer and water-absorbent resin composition are also encompassed in the range of the polyacrylic acid (salt)-based water-absorbent resin according to the present invention.

[2-1-7] Concentration of Monomer Components

The above substances and components (hereinafter, written as "monomer components") are variously selected according to the purpose, the amounts of the monomer components are defined so as to satisfy the above ranges, and the monomer components are mixed with one another, whereby a monomer aqueous solution is prepared. In the present invention, the monomer components may be made into a mixed solution with water and a hydrophilic solvent instead of being made into an aqueous solution.

From the viewpoint of the physical properties of the water absorbent agent or the water-absorbent resin, the total concentration of the monomer components is preferably not lower than 10% by mass, more preferably not lower than 20% by mass, and further preferably not lower than 30% by mass, and meanwhile, the total concentration is preferably not higher than 80% by mass, more preferably not higher than 75% by mass, and further preferably not higher than 70% by mass. The concentration of the monomer components is calculated from the following expression (1).

Concentration of monomer components (% by mass)=[(mass of monomer components)/(mass of monomer aqueous solution)]×100   expression (1)

In the above expression (1), the "mass of monomer aqueous solution" is inclusive none of the masses of a graft component, a water-absorbent resin, and a hydrophobic organic solvent for reverse phase suspension polymerization.

[2-2] Polymerization Step

The present step is a step of obtaining a hydrous gel by polymerizing the monomer aqueous solution which has been obtained in the above monomer aqueous solution preparation step and which contains the monomer containing the acrylic acid (salt) as a main component and the one or more types of polymerizable internal crosslinking agents.

[2-2-1] Polymerization Initiator

In the present invention, a polymerization initiator is used at the time of polymerization. Examples of the polymerization initiator include pyrolytic polymerization initiators, photolytic polymerization initiators, and redox-type polymerization initiators in which these polymerization initiators and reducing agents for promoting decomposition of these polymerization initiators are used in combination. Specific examples of the polymerization initiator include radical polymerization initiators such as sodium persulfate, potassium persulfate, ammonium persulfate, t-butyl hydroperoxide, hydrogen peroxide, and 2,2'-azobis(2-amidinopropane) dihydrochloride. Among these polymerization initiators, one or more types of polymerization initiators are selected in consideration of the type of polymerization and the like. From the viewpoint of handleability of the polymerization initiator and the physical properties of the water absorbent agent or the water-absorbent resin, as the polymerization initiator, a peroxide or an azo compound is preferably selected, a peroxide is more preferably selected, and a persulfate is further preferably selected. In the case of using an oxidizing radical polymerization initiator, a reducing agent such as sodium sulfite, sodium bisulfite, ferrous sulfate, or L-ascorbic acid may be used in combination to cause redox polymerization.

The use amount of the above polymerization initiator with respect to the monomer excluding the internal crosslinking agent is preferably not lower than 0.001 mol % and more preferably not lower than 0.01 mol %, and meanwhile, the use amount is preferably not higher than 1 mol %, more preferably not higher than 0.5 mol %, and further preferably not higher than 0.1 mol %. The use amount of the above reducing agent with respect to the monomer excluding the internal crosslinking agent is preferably not lower than 0.0001 mol % and more preferably not lower than 0.0005 mol %, and meanwhile, the use amount is preferably not higher than 0.02 mol % and more preferably not higher than 0.015 mol %. If the use amount is set to fall within the range, it becomes easier to obtain a water absorbent agent or a water-absorbent resin having desired water absorption performance.

Alternatively, the above polymerization reaction may be started by applying an active energy ray such as radiation, electron beam, or ultraviolet ray in the present invention. The application of active energy ray and the above polymerization initiator may be used in combination.

[2-2-2] Type of Polymerization

Examples of the type of polymerization employed in the present invention include aqueous solution polymerization, reverse phase suspension polymerization, spray polymerization, droplet polymerization, bulk polymerization, precipitation polymerization, and the like. Among these types, from the viewpoint of ease of polymerization control and the water absorption performance of the water absorbent agent or the water-absorbent resin, aqueous solution polymerization or reverse phase suspension polymerization is preferably selected, aqueous solution polymerization is more preferably selected, and continuous aqueous solution polymerization is further preferably selected. The reverse phase suspension polymerization is described in International Publication No. 2007/004529, International Publication No. 2012/023433, and the like. Examples of the continuous aqueous solution polymerization include: endless belt polymerization described in U.S. Pat. Nos. 4,893,999, 6,906,159, 7,091,253, 7,741,400, 8,519,212, Japanese Laid-Open Patent Publication No. 2005-36100, and the like; and continuous kneader polymerization described in U.S. Pat. No. 6,987,151 and the like.

Examples of a preferable type of the above continuous aqueous solution polymerization include high-temperature initiation polymerization, high-concentration polymerization, foaming polymerization, and the like. The "high-temperature initiation polymerization" refers to a type of polymerization in which the temperature of the monomer aqueous solution at the time of initiation of polymerization is set to be preferably not lower than 30° C., more preferably not lower than 35° C., further preferably not lower than 40° C., and particularly preferably not lower than 50° C., and the upper limit of the temperature is set to be the boiling point of the monomer aqueous solution. The "high-concentration polymerization" refers to a type of polymerization in which the concentration of the monomer at the time of initiation of polymerization is set to be preferably not lower than 30% by mass, more preferably not lower than 35% by mass, further preferably not lower than 40% by mass, and particularly preferably not lower than 42% by mass, and the upper limit of the concentration is set to be the saturation concentration of the monomer aqueous solution. The "foaming polymerization" refers to a type of polymerization in which the above monomer aqueous solution containing a foaming agent or bubbles is polymerized. These types of polymerizations may be performed singly, or two or more of these types of polymerizations may be performed in combination.

The above foaming polymerization is one of means for improving the specific surface area in the present invention. Examples of a method for dispersing bubbles in the foaming polymerization include:
(1) a method in which gas dissolved in the monomer aqueous solution is dispersed as bubbles by reduction in the solubility of the gas;
(2) a method in which gas is introduced from the outside and dispersed as bubbles;
(3) a method in which a foaming agent is added to the monomer aqueous solution so as to foam the monomer aqueous solution; and the like.

The above dispersion methods may be employed in combination according to the water absorption performance of the water absorbent agent or the water-absorbent resin.

In the case of the above method (2) in which gas is introduced from the outside and dispersed as bubbles, specific examples of the gas include oxygen, air, nitrogen, carbon dioxide gas, ozone, and the like, and gas mixtures thereof. Among these gases, from the viewpoint of polymerizability and cost, an inert gas such as nitrogen or carbon dioxide gas is preferably used, and nitrogen is more preferably used.

In the case of the above method (3) in which a foaming agent is added to the monomer aqueous solution so as to foam the monomer aqueous solution, specific examples of the foaming agent include azo compounds, organic or inorganic carbonate solutions or dispersion liquids, and powders having particle diameters not smaller than 0.1 μm and not larger than 1000 μm. As the foaming agent, a bicarbonate or a carbonate such as sodium carbonate, ammonium carbonate, or magnesium carbonate is preferably used.

A surfactant may be used for the above monomer aqueous solution containing the above foaming agent or bubbles in order to stably retain bubbles. Examples of the surfactant include anionic surfactants, nonionic surfactants, cationic surfactants, amphoteric surfactants, fluorine-based surfactants, organic metal surfactants, and the like. Specific examples of the surfactant include surfactants described in International Publication No. 97/017397 and U.S. Pat. No. 6,107,358.

The above polymerizations can be performed in an air atmosphere. However, from the viewpoint of the color tone of the water absorbent agent or the water-absorbent resin, the polymerizations are preferably performed in an atmosphere of an inert gas such as nitrogen or argon and are more preferably performed in the atmosphere having an oxygen concentration not higher than 1% by volume. Also regarding dissolved oxygen in the monomer aqueous solution, it is preferable that the oxygen is sufficiently substituted with an inert gas, and it is more preferable that the amount of the dissolved oxygen is lower than 1 mg/L.

Formation of a hydrous gel, a water-absorbent resin, or a water absorbent agent in a foamed form by the foaming polymerization leads to shortening of the water absorption time of the water absorbent agent or the water-absorbent resin and to facilitation of fixation of the water absorbent agent to an absorption article, and thus is preferable. The state of being in a foamed form can be confirmed by observing pores in particle surfaces with an electron microscope. Regarding the sizes of the pores, pores having diameters not smaller than 1 μm and not larger than 100 μm are given as an example. The number of the pores per particle of the water absorbent agent or the water-absorbent resin is preferably not smaller than 1 and more preferably not smaller than 10, and meanwhile, the number is preferably not larger than 10000 and more preferably not larger than 1000. The pores can be controlled through the above foaming polymerization. The foaming polymerization is a preferable technique in terms of increasing the specific surface area of the water absorbent agent or the water-absorbent resin.

[2-3] Gel Pulverization Step

The present step is a step of obtaining a hydrous gel in particle form (hereinafter, written as a "particulate hydrous gel") by gel pulverization of the hydrous gel obtained in the above polymerization step. For distinguishment from "pulverization" in a pulverization step described later, pulverization in the present step is written as "gel pulverization".

The above "gel pulverization" means adjustment of the hydrous gel into a predetermined size by using a gel pulverization machine such as a kneader, a meat chopper, or a cutter mill.

The manner of execution, an operating condition, and the like of gel pulverization that are described in Japanese Patent No. 5989913 or Japanese Patent No. 6067126 are applied also to the present invention. In the case where the type of polymerization is kneader polymerization, the polymerization step and the gel pulverization step are performed simultaneously. In the case where a particulate hydrous gel is obtained in the polymerization step as in reverse phase suspension polymerization, spray polymerization, droplet polymerization, or the like, the gel pulverization step is regarded as being performed simultaneously with the polymerization step. Through the gel pulverization step in the present invention, a water absorbent agent or a water-absorbent resin in an indefinite pulverized form can be obtained.

The particle diameter of the particulate hydrous gel finely granulated by the gel pulverization step is preferably not smaller than 0.05 mm and not larger than 10 mm. If the particle diameter of the particulate hydrous gel is excessively small, the physical properties of the water-absorbent resin that is obtained may be low. Meanwhile, if the particle diameter of the particulate hydrous gel is excessively large, drying may be insufficient.

The mass-average particle diameter D50 of the above particulate hydrous gel is preferably not smaller than 50 μm, more preferably not smaller than 100 μm, and further preferably not smaller than 140 μm, and meanwhile, the mass-average particle diameter D50 is preferably not larger than 2000 μm, more preferably not larger than 1500 μm, and further preferably not larger than 1000 μm.

A logarithmic standard deviation as indicating the degree of narrowness of a particle size distribution of the particle sizes of the above particulate hydrous gel is preferably not smaller than 0.2, and meanwhile, the logarithmic standard deviation as is preferably not larger than 1.5, more preferably not larger than 1.3, and further preferably not larger than 1.2. The logarithmic standard deviation $\sigma\zeta$, of a particle size distribution, that takes a smaller value has an advantage of leading to more regular particle diameters so that more even drying can be performed. However, setting of the logarithmic standard deviation as of the particle size distribution to be smaller than 0.2 requires special operations such as: control of particle sizes at the time of polymerization before the gel pulverization; and classification of the particulate hydrous gel after the gel pulverization. Thus, the said setting is substantially difficult to perform from the viewpoint of productivity and cost.

In the present invention, it is desirable to control one or more means among (1) foaming polymerization of the monomer aqueous solution, (2) granulation of the particulate hydrous gel or a dried polymer thereof, and (3) fine powder recycling, such that the specific surface area of the water-absorbent resin is set to be not lower than 25 m²/kg.

As the above item (1) foaming polymerization of the monomer aqueous solution, for example, foaming polymerization in which a surfactant coexists with the monomer aqueous solution, i.e., a foaming polymerization method described in Japanese Patent No. 5647625, is employed, whereby the specific surface area of the water-absorbent resin can be increased to be not lower than 25 m²/kg. Therefore, it is also preferable that the water-absorbent resin is obtained by foaming polymerization of an unsaturated monomer aqueous solution.

As the above item (2) granulation of the particulate hydrous gel or a dried polymer thereof, for example, a gel pulverization method described in any of Japanese Patent No. 5989913, Japanese Patent No. 6067126, and International Publication No. 2016/204302 is employed for the gel pulverization step, and further, drying is performed, whereby the specific surface area of the water-absorbent resin can be increased to be not lower than 25 m²/kg. A water-absorbent resin having a desired specific surface area is obtained also by appropriately controlling the die bore diameter, the number of bores, the die thickness, the hot water addition amount, the rotation rate about a screw axis, and the like of a gel pulverization machine such as a meat chopper. The above granulation may be performed on the hydrous gel at the time of polymerization, may be performed on a finely pulverized product of the post-polymerization hydrous gel simultaneously with drying, or may be performed on a post-drying finely pulverized product by using water and/or an organic or inorganic binder. Therefore, it is also preferable that a granulated material of the hydrous gel of the water-absorbent resin or a dried substance of the hydrous gel is contained.

As the above item (3) fine powder recycling, for example, fine powder of the water-absorbent resin having passed through a sieve having a mesh opening size of 150 μm is collected in the polymerization step, the gel pulverization step, or a drying step, or the fine powder is granulated and then collected, whereby the specific surface area of the water-absorbent resin can be increased to be not lower than 25 m²/kg. Therefore, it is also preferable that the water-absorbent resin contains a recycled product of fine powder of the water-absorbent resin.

The methods of the above items (1) to (3) may be performed singly or may be performed in combination.

As a method for increasing the specific surface area of the water-absorbent resin to be not lower than 25 m²/kg, there is also a method in which many particles having small particle diameters are caused to be contained. However, this method leads to containing of many particles having small particle diameters, particularly, fine powder having passed through a sieve having a mesh opening size of 150 μm. As a result, gel blocking of the obtained water absorbent agent easily occurs, whereby liquid absorption performance and liquid permeation performance under load are reduced. Thus, this method is not preferable. Therefore, in the case of adjusting the specific surface area by using the fine powder, the methods of the above items (2) and (3) are preferably employed. In the present invention, it is important to perform an adjustment method described later while sufficiently paying attention to adjustment of a particle size distribution.

The mass-average particle diameter D50 of the above particulate hydrous gel and the logarithmic standard deviation as of the particle size distribution are measured according to methods described in the pamphlet of International Publication No. 2016/111223.

[2-4] Drying Step

The present step is a step of obtaining a dried polymer by drying the hydrous gel and/or the particulate hydrous gel obtained in the above polymerization step and/or gel pulverization step to a desired resin solid content. The resin solid content of the dried polymer is obtained from a change in mass at the time of heating 1 g of the water-absorbent resin at 180° C. for 3 hours. The resin solid content is preferably not lower than 80% by mass, more preferably not lower than 85% by mass, further preferably not lower than 90% by mass, and particularly preferably not lower than 92% by mass, and meanwhile, the resin solid content is preferably not higher than 99% by mass, more preferably not higher than 98% by mass, and further preferably not higher than 97% by mass.

Specific examples of the method for drying the above hydrous gel and/or particulate hydrous gel include heat drying, hot air drying, drying under reduced pressure, fluidized bed drying, infrared drying, microwave drying, drum dryer drying, drying through azeotropic dehydration with a hydrophobic organic solvent, high humidity drying using high-temperature steam, and the like. Among these methods, from the viewpoint of drying efficiency, hot air drying is preferable, and band drying in which hot air drying is performed on a ventilation belt is more preferable.

From the viewpoint of the color tone of and drying efficiency for the water-absorbent resin, a drying temperature in the above hot air drying is preferably not lower than 100° C. and more preferably not lower than 150° C., and meanwhile, the drying temperature is preferably not higher than 300° C. and more preferably not higher than 200° C. The drying temperature in the hot air drying is determined by the temperature of hot air. Drying conditions other than the above drying temperature such as the speed of hot air and a drying time may be set appropriately according to the moisture content and the total mass of the particulate hydrous gel to be dried and a target resin solid content. When band drying is performed, various conditions described in the pamphlet of International Publication No. 2006/100300, the pamphlet of International Publication No. 2011/025012, the pamphlet of International Publication No. 2011/025013, the pamphlet of International Publication No. 2011/111657, and the like are adopted appropriately as the drying conditions.

The drying time in the present invention is preferably not shorter than 1 minute, more preferably not shorter than 5 minutes, and further preferably not shorter than 10 minutes, and meanwhile, the drying time is preferably not longer than 10 hours, more preferably not longer than 3 hours, and further preferably not longer than 1 hour. If the drying temperature and the drying time are set to fall within the ranges, the physical properties of the water absorbent agent to be obtained can be set to fall within desired ranges. In addition, the physical properties of the water-absorbent resin as an intermediate product can also be set to fall within desired ranges. In the case where drying is performed by hot air drying, the speed of hot air is preferably not lower than 0.5 m/s, and meanwhile, the speed is preferably not higher than 3.0 m/s and more preferably not higher than 2.0 m/s. Other drying conditions only have to be set appropriately according to the moisture content and the total weight of the particulate hydrous gel to be dried, a target solid content, and the like.

[2-5] Pulverization Step and Classification Step

These steps are such that the post-drying dried polymer obtained through the above drying step is pulverized in a pulverization step and adjustment to particle sizes within a desired range is performed in a classification step, to obtain a pre-surface-crosslinking water-absorbent resin. Through the pulverization step after drying, a water-absorbent resin or a water absorbent agent in an indefinite pulverized form can be obtained.

Specific examples of a pulverizer used in the above pulverization step include high-speed rotary pulverizers such as a roll mill, a hammer mill, a screw mill, and a pin mill, a vibration mill, a knuckle type pulverizer, a cylindrical mixer, and the like. Among these pulverizers, a roll mill is preferably selected from the viewpoint of pulverization efficiency. A plurality of these pulverizers may be used in combination as well.

Examples of an adjustment method for particle sizes in the above classification step include sieve classification with a JIS standard sieve (JIS Z8801-1 (2000)), air-flow classification, and the like. Among these adjustment methods, sieve classification is preferably selected from the viewpoint of classification efficiency. The steps in which particle size adjustment for the water absorbent agent or the water-absorbent resin is performed, are not limited to the pulverization step and the classification step. The particle size adjustment may be performed in the polymerization step that particularly involves reverse phase suspension polymerization, droplet polymerization, or the like. The particle size adjustment may be performed also in another step, e.g., a granulating step or a fine powder collecting step.

In the pre-surface-crosslinking water-absorbent resin having been classified, (i) the proportion of particles contained therein and having particle diameters smaller than 150 μm is preferably not higher than 3% by mass, more preferably not higher than 2.5% by mass, and further preferably not higher than 2% by mass.

In addition, (ii) the mass-average particle diameter D50 is preferably not smaller than 250 μm and more preferably not smaller than 300 μm, and meanwhile, the mass-average particle diameter D50 is preferably smaller than 550 μm, more preferably not larger than 500 μm, further preferably not larger than 450 μm, and particularly preferably not larger than 400 μm.

Further, (iii) it is more preferable that, in a particle size distribution of the pre-surface-crosslinking water-absorbent resin, the mass-average particle diameter D50 falls within the range in the above condition (ii) and the proportion of the particles smaller than 150 μm falls within the range in the above condition (i).

Furthermore, (iv) the logarithmic standard deviation u indicating the degree of narrowness of the particle size distribution is preferably not smaller than 0.20, more preferably not smaller than 0.25, and further preferably not smaller than 0.27, and meanwhile, the logarithmic standard deviation u is preferably not larger than 0.50, more preferably not larger than 0.40, and further preferably not larger than 0.35. The logarithmic standard deviation σu, of the particle size distribution, that takes a smaller value has an advantage of leading to more regular particle diameters so that segregation of the particles occurs less. However, excessive reduction in the logarithmic standard deviation u of the particle size distribution requires removal of coarse particles and fine particles by repetition of pulverization and classification, whereby a disadvantage may be incurred from the viewpoint of productivity and cost.

The above particle size and the like, i.e., the above conditions (i) to (iv), are applied not only to the post-surface-crosslinking water-absorbent resin but also to the water absorbent agent. Thus, it is preferable to perform surface-crosslinking treatment, i.e., treatment in a surface-crosslinking step such that the particle sizes having been adjusted to fall within the above range for the pre-surface-crosslinking water-absorbent resin are maintained. It is more preferable to adjust the particle sizes by providing a sizing step subsequently to the surface-crosslinking step. In the present invention, the above condition (i) and the above condition (iv), the above condition (ii) and the above condition (iv), or the above condition (iii) and the above condition (iv) can be arbitrarily selected and combined. In this case, the preferable ranges in the respective conditions can be arbitrarily combined.

The CRC of the above pre-surface-crosslinking water-absorbent resin is preferably not lower than 10 g/g, more preferably not lower than 20 g/g, and further preferably not lower than 25 g/g, and meanwhile, the CRC is preferably not higher than 100 g/g, more preferably not higher than 80 g/g, and further preferably not higher than 60 g/g. If the CRC is excessively low, a desired CRC in the present application is not obtained after surface-crosslinking. Meanwhile, if the CRC is excessively high, the soluble content becomes high, and a return amount increases at the time of use as a disposable diaper. Therefore, it is desirable to control the CRC to fall within the above range.

The Vortex of the above pre-surface-crosslinking water-absorbent resin is preferably not shorter than 10 seconds, and meanwhile, the Vortex is preferably not longer than 60 seconds, more preferably not longer than 50 seconds, and further preferably not longer than 45 seconds. For shortening the Vortex, productivity needs to be sacrificed. Meanwhile, if the Vortex is elongated, a water absorbent agent having physical properties desired in the present application is not obtained. Therefore, it is desirable to control the Vortex to fall within the above range.

[2-6] Surface-Crosslinking Step

The present step is a step of forming a portion having a higher crosslink density on the surface layer of the pre-surface-crosslinking water-absorbent resin obtained through the above steps. The present step includes a mixing step, a heating step, a cooling step, and the like. In the surface-crosslinking step, radical crosslinking, surface polymerization, a crosslinking reaction with a surface-crosslinking agent, and the like occur at the surface of the water-absorbent resin not having yet been subjected to the surface-crosslinking step, whereby a surface-crosslinked water-absorbent resin is obtained.

[2-6-1] Mixing Step

The present step is a step of obtaining a humidified mixture by mixing, in a mixing device, a solution containing a surface-crosslinking agent (hereinafter, written as a "surface-crosslinking agent solution") with the pre-surface-crosslinking water-absorbent resin.

[2-6-1-1] Surface-Crosslinking Agent

In the present invention, a surface-crosslinking agent is used at the time of surface-crosslinking. Specific examples of the surface-crosslinking agent include polyhydric alcohol compounds, amino alcohols, alkylene carbonate compounds, oxazolidinone compounds, and epoxy compounds. It is preferable to use at least one type of surface-crosslinking agent selected from among these surface-crosslinking agents. An organic surface-crosslinking agent capable of forming ester bonds between the organic surface-crosslinking agent and a carboxyl group is preferable as the surface-crosslinking agent. Examples of the surface-crosslinking agent that forms ester bonds (preferably, dehydration ester bonds) between the surface-crosslinking agent and a functional group, e.g., a carboxyl group, of the polycarboxylic acid-based water-absorbent resin, include: surface-crosslinking agents having hydroxyl groups in the molecules thereof, such as polyhydric alcohols and amino alcohols; and surface-crosslinking agents that generate hydroxyl groups by ring-opening, such as alkylene carbonates, oxazolidinones, oxetanes, and epoxy compounds.

More specific examples of the above surface-crosslinking agent include: polyhydric alcohol compounds such as ethylene glycol, diethylene glycol, triethylene glycol, tetraethylene glycol, polyethylene glycol, propylene glycol, 1,3-propanediol, 1-methyl-1,3-propanediol, 2-methyl-1,3-propanediol, dipropylene glycol, 2,2,4-trimethyl-1,3-pentanediol, 2,3,4-trimethyl-1,3-pentanediol, polypropylene glycol, glycerin, polyglycerin, 2-butene-1,4-diol, 1,4-butanediol, 1,3-butanediol, 1,5-pentanediol, 1,6-hexanediol, 1,2-cyclohexanemethanol, 1,2-cyclohexanedimethanol, 1,2-cyclohexanediol, trimethylolpropane, diethanolamine, triethanolamine, polyoxypropylene, oxyethylene-oxypropylene block copolymer, pentaerythritol, meso-erythritol, D-sorbitol, and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol; polyvalent amine compounds such as ethylenediamine, diethylene triamine, triethylene tetramine, tetraethylene pentamine, pentaethylene hexamine, polyethyleneimine, and polyamide polyamine, and inorganic salts and organic salts of these polyvalent amine compounds, e.g., aziridinium salt and the like; polyvalent isocyanate compounds such as 2,4-tolylene diisocyanate and hexamethylene diisocyanate; haloepoxy compounds such as epichlorohydrin, epibromohydrin, and α-methylepichlorohydrin; polyvalent oxazoline compounds such as 1,2-ethylenebisoxazoline; oxazolidinone compounds such as N-acyloxazolidinone and 2-oxazolidinone; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one; cyclic urea compounds; oxetane compounds such as oxetane, 2-methyloxetane, 3-methyl-3-hydroxymethyloxetane, and 3-ethyl-3-hydroxymethyloxetane; amino alcohol compounds such as ethanolamine; polyvalent metal compounds such as hydroxides and chlorides of zinc, calcium, magnesium, aluminum, iron, zirconium, and the like; and the like.

Among these surface-crosslinking agents, at least one type of surface-crosslinking agent selected from the group consisting of polyhydric alcohol compounds, epoxy compounds, polyvalent amine compounds and salts thereof, oxetane compounds, and alkylene carbonate compounds, is preferable. The surface-crosslinking agent is more preferably one or more types selected from the group consisting of: polyhydric alcohols having 3 or more and 6 or less carbon atoms, and having 2 or more and 3 or less hydroxyl groups contained in the molecules thereof, epoxy compounds having 6 or more and 12 or less carbon atoms; alkylene carbonates having 3 or more and 5 or less carbon atoms; and oxetane compounds having 3 or more and 10 or less carbon atoms.

Out of the above surface-crosslinking agents, one type of surface-crosslinking agent or two or more types of surface-crosslinking agents are used in consideration of the reactivity thereof and the heating temperature in the heating step. The surface-crosslinking step may be performed two or more times in consideration of the effect thereof. In this case, the second or subsequent time of the step may be performed by using the same surface-crosslinking agent as that in the first time of the step, or may be performed by using a different surface-crosslinking agent.

The use amount of the above surface-crosslinking agent per 100 parts by mass of the pre-surface-crosslinking water-absorbent resin is preferably not lower than 0.01 parts by mass, and meanwhile, the use amount is preferably not higher than 10 parts by mass, more preferably not higher than 5 parts by mass, and further preferably not higher than 2 parts by mass. If the use amount of the surface-crosslinking agent is set to fall within the range, an optimum crosslinked structure can be formed at the surface layer of the pre-surface-crosslinking water-absorbent resin, and it becomes even easier to obtain a water-absorbent resin or a water absorbent agent having high physical properties. In the case of using a plurality of surface-crosslinking agents, the use amount refers to the total amount of the surface-crosslinking agents.

The above surface-crosslinking agent is preferably added in the form of a solution to the above water-absorbent resin, and more preferably added as an aqueous solution to the pre-surface-crosslinking water-absorbent resin. In this case, the use amount of water per 100 parts by mass of the pre-surface-crosslinking water-absorbent resin is preferably not lower than 0.1 parts by mass, more preferably not lower than 0.3 parts by mass, and further preferably not lower than 0.5 parts by mass, and meanwhile, the use amount is preferably not higher than 20 parts by mass, more preferably not higher than 15 parts by mass, and further preferably not higher than 10 parts by mass. If the use amount of water is set to fall within the range, the handleability of the surface-crosslinking agent solution is further improved, and it becomes easy to evenly mix the surface-crosslinking agent with the pre-surface-crosslinking water-absorbent resin.

The concentration of the surface-crosslinking agent in the above surface-crosslinking agent solution is preferably not lower than 0.1% by mass, more preferably not lower than 10% by mass, and further preferably not lower than 20% by mass, and meanwhile, the concentration is preferably not higher than 60% by mass, more preferably not higher than 50% by mass, and further preferably not higher than 45% by mass. If the concentration of the surface-crosslinking agent is set to fall within the above range, an optimum crosslinked structure can be formed at the surface layer of the pre-surface-crosslinking water-absorbent resin having a high specific surface area, and physical properties such as water absorption performance can be improved.

In addition, a hydrophilic organic solvent can also be used in combination with the above water as necessary, to obtain the above surface-crosslinking agent solution. In this case, the use amount of the hydrophilic organic solvent per 100 parts by mass of the pre-surface-crosslinking water-absorbent resin is preferably not higher than 5 parts by mass, more preferably not higher than 3 parts by mass, and further preferably not higher than 1 part by mass. Specific examples of the hydrophilic organic solvent include: lower alcohols such as methyl alcohol; ketones such as acetone; ethers such as dioxane; amides such as N,N-dimethylformamide; sulfoxides such as dimethyl sulfoxide; polyhydric alcohols such as ethylene glycol; and the like. However, although these hydrophilic organic solvents serve as mixing aids for evenly dispersing the surface-crosslinking agent at the surface of the water-absorbent resin, the hydrophilic organic solvents lead to increase in cost from a commercial viewpoint. Thus, also in the case of using a hydrophilic organic solvent, the use amount thereof is preferably limited to as small an amount as possible.

In addition, various additives to be added in "[2-7] Additives and Addition Step Therefor" and "[2-8] Sulfur-Containing Reducing Agent Aqueous Solution and Addition Step Therefor" described below can be added to the above surface-crosslinking agent solution or can also be separately added in the mixing step, within a range of not higher than 5 parts by mass per 100 parts by mass of the pre-surface-crosslinking water-absorbent resin.

[2-6-1-2] Mixing Method and Mixing Condition

Examples of a method for mixing the above pre-surface-crosslinking water-absorbent resin and the above surface-crosslinking agent solution include a method in which: a surface-crosslinking agent solution is made in advance; and the solution is mixed by preferably being sprayed or dropped and more preferably being sprayed to the pre-surface-crosslinking water-absorbent resin.

As a mixing device for performing the above mixing, a mixing device having a torque that is necessary to evenly and assuredly mix the pre-surface-crosslinking water-absorbent resin and the surface-crosslinking agent with each other is preferable. The mixing device is preferably a high-speed stirring type mixer and more preferably a high-speed stirring type continuous mixer. The rotation rate of the high-speed stirring type mixer is preferably not lower than 100 rpm and more preferably not lower than 300 rpm, and meanwhile, the rotation rate is preferably not higher than 10000 rpm and more preferably not higher than 2000 rpm.

From the viewpoint of mixability with the surface-crosslinking agent solution and aggregability of the humidified mixture, the temperature of the pre-surface-crosslinking water-absorbent resin supplied in the present step is preferably not lower than 35° C., and meanwhile, the temperature is preferably not higher than 80° C., more preferably not higher than 70° C., and further preferably not higher than 60° C. The mixing time is preferably not shorter than 1 second and more preferably not shorter than 5 seconds, and meanwhile, the mixing time is preferably not longer than 1 hour and more preferably not longer than 10 minutes.

[2-6-2] Heating Step

The present step is a step of heating the humidified mixture obtained in the above mixing step, to cause a crosslinking reaction on the surface of the pre-surface-crosslinking water-absorbent resin.

The heating of the above humidified mixture may be performed in a state where the humidified mixture is left at rest, or may be performed while the humidified mixture is in a flowing state by using power of stirring or the like. However, the humidified mixture is preferably heated while being stirred, in that the entire humidified mixture can be evenly heated. Specific examples of a heating device for performing the above heating include a paddle dryer, a multi-fin processor, a towered dryer, and the like.

The heating temperature in the present step is set appropriately from the viewpoint of: the timing of adding the sulfur-containing reducing agent aqueous solution; the type and the amount of the surface-crosslinking agent; and the water absorption performance and odor of the water absorbent agent or the water-absorbent resin. Specifically, in the case where the above sulfur-containing reducing agent aqueous solution is added to the pre-surface-crosslinking water-absorbent resin, in other words, in the case where the sulfur-containing reducing agent aqueous solution is added at one or more timings among a timing before addition of the surface-crosslinking agent, a timing simultaneous with addition of the surface-crosslinking agent, and a timing after addition of the surface-crosslinking agent but before the initiation of a surface-crosslinking reaction by heating, the above heating temperature is preferably not lower than 80° C. and more preferably not lower than 90° C., and meanwhile, the heating temperature is preferably not higher than 150° C. and more preferably not higher than 140° C. Meanwhile, in the case where the above sulfur-containing reducing agent aqueous solution is added to the post-surface-crosslinking water-absorbent resin, in other words, in the case where the sulfur-containing reducing agent aqueous solution is added after the initiation of a surface-crosslinking reaction by heating, the above heating temperature is preferably higher than 150° C., more preferably not lower than 170° C., and further preferably not lower than 180° C., and meanwhile, the heating temperature is preferably not higher than 250° C. and more preferably not higher than 230° C.

Regardless of the timing of adding the sulfur-containing reducing agent aqueous solution, the heating time in the present step is preferably not shorter than 5 minutes and more preferably not shorter than 7 minutes, and meanwhile, the heating time is preferably not longer than 1.5 hours and more preferably not longer than 1 hour.

Control of the above heating temperature and the above heating time to fall within the above ranges leads to improvement in the water absorption performance of the water absorbent agent or the post-surface-crosslinking water-absorbent resin to be obtained, and thus is preferable.

[2-6-3] Cooling Step

The present step is an optional step provided as necessary subsequently to the above heating step. The present step is a step of forcibly cooling the post-surface-crosslinking water-absorbent resin having been subjected to the above heating step to a predetermined temperature, to swiftly end the surface-crosslinking reaction.

The cooling of the above post-surface-crosslinking water-absorbent resin may be performed in a state where the water-absorbent resin is left at rest, or may be performed while the water-absorbent resin is in a flowing state by using power of stirring or the like. However, the water-absorbent resin is preferably cooled while being stirred, in that the entire water-absorbent resin can be evenly cooled. Examples of a cooling device for performing the above cooling include a paddle dryer, a multi-fin processor, a towered dryer, and the like from the above viewpoint. These cooling devices may have the same specifications as those of the heating device used in the heating step. This is because the heating device can be used as a cooling device by changing the heat medium of the heating device to a cooling medium.

The cooling temperature in the present step only has to be set appropriately according to the heating temperature in the heating step, the water absorption performance of the water absorbent agent or the post-surface-crosslinking water-absorbent resin, and the like. Specifically, cooling is desirably performed such that the temperature of the post-surface-crosslinking water-absorbent resin is preferably not higher than 150° C., more preferably not higher than 100° C., further preferably not higher than 90° C., and particularly preferably not higher than 80° C., and meanwhile, the temperature is preferably not lower than 20° C. and more preferably not lower than 30° C. Setting of the temperature of the post-surface-crosslinking water-absorbent resin to fall within the above range enables further suppression of abnormal odor caused by sulfur oxide or the like generated at the time of adding the sulfur-containing reducing agent aqueous solution to the water-absorbent resin in a high-temperature state and leads to achievement of favorable mixability between the sulfur-containing reducing agent aqueous solution and the water-absorbent resin, and thus is preferable.

The water-absorbent resin having an increased specific surface area has a shorter water absorption time than a conventional product. Thus, it is difficult to apply the sulfur-containing reducing agent aqueous solution evenly among particles. Therefore, if the mixability of the sulfur-containing reducing agent aqueous solution particularly with the water-absorbent resin having an increased specific surface area is considered, control of the temperature to fall within the above range also enables suppression of generation of aggregated coarse particles. Meanwhile, the water absorption time of the water-absorbent resin is influenced also by the temperature. Thus, if a sulfur-containing water absorbent agent aqueous solution is added to and mixed with the water-absorbent resin having an excessively high temperature, a part of the water-absorbent resin absorbs the sulfur-containing reducing agent aqueous solution. Consequently, the surface of the water-absorbent resin becomes adhesive, and aggregated coarse particles are easily generated. In addition, evenness after mixing is also reduced, and thus the difference in the residual monomer content among particle sizes increases.

The form of the post-surface-crosslinking water-absorbent resin may be any of a spherical form, a granulated material form, an aggregate form, an indefinite pulverized form, and the like. However, if the water absorption time of the water-absorbent resin is considered, an indefinite pulverized form is preferable. Meanwhile, if the water-absorbent resin is subjected to crushing or the like after surface-crosslinking, a surface-crosslinking effect is reduced, and thus the form of the water-absorbent resin is preferably an indefinite pulverized form before and after the surface-crosslinking. Specifically, it is preferable that: the form of the water-absorbent resin in the water-absorbent resin surface-crosslinking step is an indefinite pulverized form; and, if an effect due to adding the sulfur-containing reducing agent aqueous solution is considered, the form of the above water-absorbent resin when the sulfur-containing reducing agent aqueous solution is added in the sulfur-containing reducing agent aqueous solution mixing step, is also an indefinite pulverized form. The water-absorbent resin having an indefinite pulverized form can be obtained by pulverizing the hydrous gel or the dried polymer.

The proportion of water-absorbent resin particles that are contained in the post-surface-crosslinking water-absorbent resin and that have particle diameters smaller than 150 μm is preferably lower than 3% by mass. The particles smaller than 150 μm have much higher specific surface areas and thus have higher aqueous liquid absorption speeds than particles not smaller than 150 μm. Thus, increase in the particles smaller than 150 μm to be not lower than 3% by mass causes these particles to preferentially absorb the sulfur-containing reducing agent aqueous solution, causes the sulfur-containing reducing agent aqueous solution to be unevenly mixed with the entire post-surface-crosslinking water-absorbent resin, and causes generation of coarse particles resulting from aggregation of the particles smaller than 150 μm, and thus is not preferable. The particles smaller than 150 μm can be appropriately adjusted by employing the same particle size adjustment method as the method in the above classification step for the water-absorbent resin. Besides the proportion of the particles smaller than 150 μm, the above conditions, i.e., (ii) the mass-average particle diameter D50, (iii) the mass-average particle diameter D50 and the particles smaller than 150 μm, (iv) the logarithmic standard deviation σζ, combinations of these conditions, and suitable ranges thereof are as described above. In particular, the logarithmic standard deviation σζ, of the particle size distribution, that falls within the above desired range leads to reduction in variation in the specific surface area among particles and also reduction in variation in the aqueous liquid absorption speed and facilitates even mixing at the time of adding the sulfur-containing reducing agent aqueous solution, and thus is preferable.

[2-7] Additives and Addition Step Therefor

In the present invention, an additive may be added to one or more of the pre-surface-crosslinking water-absorbent resin and the post-surface-crosslinking water-absorbent resin. In other words, the water absorbent agent can contain the additive in addition to the water-absorbent resin. Examples of the additive include liquid permeability improvers or identical-component agents, and other additives. One type of these additives may be used, or two or more types of these additives may be used in combination.

[2-7-1] Liquid Permeability Improver or Identical-Component Agent

Examples of the liquid permeability improver used in the present invention include an additive having a function of improving the saline solution flow conductivity (hereinafter, referred to as "SFC") and the gel bed permeability under load or under no load (hereinafter, referred to as "GBP") of the water absorbent agent or the water-absorbent resin. For example, at least one type of compound selected from among polyvalent metal salts, cationic polymers, and inorganic fine particles can be used. As necessary, two or more types of the compounds can be used in combination.

These additives may be used to exhibit other functions such as those of an anti-caking agent at moisture absorption, a powder flow control agent, and a binder for water-absorbent resins without being intended to improve liquid permeability. If the additives are added for the purpose of the other functions, the additives are referred to as identical-component agents. The addition amount of the above liquid permeability improver or identical-component agent is set appropriately according to the selected compound. Not only in the case of using these additives singly but also in the case of using two or more types of these additives in combination, respective suitable addition amounts thereof can be selected appropriately within ranges described below.

The above "SFC" is an abbreviation for Saline Flow Conductivity. The SFC indicates the liquid permeability, by a 0.69%-by-mass aqueous solution of sodium chloride, of the water absorbent agent or the water-absorbent resin under a load of 2.07 kPa. The SFC is a value measured according to an SFC test method described in U.S. Pat. No. 5,669,894.

The above "GBP" is an abbreviation for Gel Bed Permeability. The GBP indicates the liquid permeability, by a 0.9%-by-mass aqueous solution of sodium chloride, of the water absorbent agent or the water-absorbent resin under load or in a state of free swelling. The GBP is a value measured according to a GBP test method described in International Publication No. 2005/016393.

[2-7-1-1] Polyvalent Metal Salt

In the case of using a polyvalent metal salt, the valence of a polyvalent metal cation of the polyvalent metal salt is preferably not smaller than 2 and more preferably not smaller than 3, and meanwhile, the valence is preferably not larger than 4. Examples of a usable polyvalent metal include aluminum, zirconium, and the like. Therefore, examples of the polyvalent metal salt that is usable in the present step include aluminum lactate, zirconium lactate, aluminum sulfate, zirconium sulfate, and the like. Among these polyvalent metal salts, from the viewpoint of an effect of improving the SFC, aluminum lactate or aluminum sulfate is more preferable and aluminum sulfate is further preferable.

The addition amount of the above polyvalent metal salt per 1 g of the water-absorbent resin is preferably not smaller than 0 moles and smaller than $3.6 \times 10^{-5}$ moles, more preferably not smaller than 0 moles and smaller than $1.4 \times 10^{-5}$ moles, and further preferably not smaller than 0 moles and smaller than $1.0 \times 10^{-5}$ moles.

[2-7-1-2] Cationic Polymer

In the case of using a cationic polymer, examples of the cationic polymer include substances described in U.S. Pat. No. 7,098,284. Among these substances, from the viewpoint of an effect of improving the SFC and the GBP, vinylamine polymer is more preferable. The mass-average molecular weight of the cationic polymer is preferably not smaller than 5000 and not larger than 1000000.

The addition amount of the above cationic polymer per 100 parts by mass of the water-absorbent resin is preferably not lower than 0 parts by mass and more preferably higher than 0 parts by mass, and meanwhile, the addition amount is preferably lower than 2.5 parts by mass, more preferably lower than 2.0 parts by mass, and further preferably lower than 1.0 part by mass.

[2-7-1-3] Inorganic Fine Particles

In the case of using inorganic fine particles, examples of the inorganic fine particles include substances described in U.S. Pat. No. 7,638,570. Among these substances, from the viewpoint of the effect of improving the SFC and the GBP, silicon dioxide is preferable.

In the case where the above inorganic fine particles have a primary particle diameter smaller than 20 nm, the inorganic fine particles only have to be added such that the amount thereof per 100 parts by mass of the water-absorbent resin is preferably not lower than 0 parts by mass and more preferably higher than 0 parts by mass, and meanwhile, the amount is preferably lower than 1.2 parts by mass, more preferably lower than 1.0 part by mass, and further preferably lower than 0.5 parts by mass. Meanwhile, in the case where the primary particle diameter is not smaller than 20 nm, the inorganic fine particles only have to be added such that the amount thereof per 100 parts by mass of the water-absorbent resin is preferably not lower than 0 parts by mass and more preferably higher than 0 parts by mass, and meanwhile, the amount is preferably lower than 2.0 parts by mass, more preferably lower than 1.5 parts by mass, and further preferably lower than 1.0 part by mass.

[2-7-2] Another Additive

Specific examples of another additive include chelating agents, inorganic reducing agents, aromatic substances, organic reducing agents, hydroxy carboxylic acid compounds, surfactants, compounds having phosphorus atoms, oxidizing agents, organic powders of metallic soap and the like, deodorants, antibacterial agents, pulp, thermoplastic fibers, and the like. One of the other additives is usable, or two or more of the other additives are also usable. Among the other additives, chelating agents are preferable, and amino-polycarboxylic acids and amino-polyvalent phosphoric acids are more preferable. Specific examples of the chelating agent include chelating agents described in Japanese Laid-Open Patent Publication No. H11-060975, the pamphlet of International Publication No. 2007/004529, the pamphlet of International Publication No. 2011/126079, the pamphlet of International Publication No. 2012/023433, Japanese Laid-Open Patent Publication (Translation of PCT Application) No. 2009-509722, Japanese Laid-Open Patent Publication No. 2005-097519, Japanese Laid-Open Patent Publication No. 2011-074401, Japanese Laid-Open Patent Publication No. 2013-076073, Japanese Laid-Open Patent Publication No. 2013-213083, Japanese Laid-Open Patent Publication No. S59-105448, Japanese Laid-Open Patent Publication No. S60-158861, Japanese Laid-Open Patent Publication No. H11-241030, Japanese Laid-Open Patent Publication No. H2-41155, and the like.

The other additive, particularly the chelating agent, is added or contained preferably within a range of not lower than 0.001% by mass and not higher than 1% by mass with respect to the monomer or the water-absorbent resin.

[2-7-3] Additive Addition Step

The above additives can be added before, after, or during at least one step selected from among the above monomer aqueous solution preparation step, the above polymerization step, the above gel pulverization step, the above drying step, the above pulverization step, the above classification step, and the above surface-crosslinking step. The additives are preferably added before, after, or during any step subsequent to the polymerization step.

In the case where the above additives are added to the water-absorbent resin, if the additives are in the form of a liquid or a solution obtained with an aqueous medium such as water, it is preferable to spray the liquid or the solution to the water-absorbent resin and apply a sufficient torque to evenly and assuredly mix the water-absorbent resin and the additives with each other. Meanwhile, if the above additives are in a solid form such as powder form, the additives may be dry-blended with the water-absorbent resin, or an aqueous liquid such as water may be used as a binder.

Specific examples of a device used for the above mixing include a stirring type mixer, a cylindrical mixer, a double walled conical mixer, a V-shaped mixer, a ribbon mixer, a screw mixer, a flow type/rotary disk type mixer, an airflow mixer, a double-arm kneader, an internal mixer, a pulverizing kneader, a rotary mixer, a screw extruder, and the like. In the case of using a stirring type mixer, the rotation rate thereof is preferably not lower than 5 rpm and more preferably not lower than 10 rpm, and meanwhile, the rotation rate is preferably not higher than 10000 rpm and more preferably not higher than 2000 rpm.

[2-8] Sulfur-Containing Reducing Agent Aqueous Solution and Addition Step Therefor The present step is a step of adding the sulfur-containing reducing agent in the form of an aqueous solution to the water-absorbent resin having a high specific surface area and obtained through the above steps. With the present invention, a water absorbent agent having a high specific surface area and prone to less variation in the residual monomer content among particle sizes of the water absorbent agent is obtained. In addition, reduction in the residual monomer content and reduction in the amount of aggregated coarse particles can also be achieved.

The present invention is a method for producing a water absorbent agent having a water-absorbent resin as a main component, the method including a surface-crosslinking step for a water-absorbent resin and a mixing step for a sulfur-containing reducing agent aqueous solution, wherein the method satisfies the following (1) to (4):

(1) a specific surface area of the water-absorbent resin is not lower than 25 m²/kg;

(2) an average droplet diameter of the sulfur-containing reducing agent aqueous solution is not larger than 2.5 mm, and a temperature of the aqueous solution is not higher than 80° C.;

(3) stirring-mixing is performed so as to satisfy the following expression (a) in the mixing step, stirring force coefficient≥0.16×(average droplet diameter (mm))+0.05     (a), where the stirring force coefficient is defined by (Froude number Fr)×(gravitational acceleration g); and (4) a heating and drying step is performed at not lower than 40° C. and not higher than 150° C. after the mixing step.

Although the sulfur-containing reducing agent aqueous solution is added to and mixed with the water-absorbent resin in the present invention, the water-absorbent resin may not have yet been surface-crosslinked or may have already been surface-crosslinked. The specific surface area of the water-absorbent resin is not lower than 25 m²/kg. If the specific surface area of the water-absorbent resin is low, a water absorbent agent having a sufficient water absorption time (Vortex) is not obtained. The specific surface area of the water-absorbent resin only has to be set according to a desired specific surface area of the water absorbent agent. However, a higher specific surface area of the water-absorbent resin is more preferable, and the specific surface area is preferably not lower than 26 m²/kg, not lower than 27 m²/kg, not lower than 28 m²/kg, not lower than 29 m²/kg, and not lower than 30 m²/kg in this order. Meanwhile, the specific surface area is preferably not higher than 50 m²/kg and not higher than 45 m²/kg in this order.

[2-8-1] Sulfur-Containing Reducing Agent Aqueous Solution

Examples of the sulfur-containing reducing agent include: sulfur oxide compounds in each of which the nominal oxidation number of sulfur is +2, +3, or +4; and sulfur compounds each containing an SH group. The sulfur-containing reducing agent is preferably water-soluble, more preferably a water-soluble sulfur-containing reducing agent that dissolves by at least 0.1 g per 100 g of water at 25° C., and further preferably a water-soluble sulfur-containing reducing agent that dissolves by at least 1 g per 100 g of water at 25° C. The sulfur-containing reducing agent may be an inorganic reducing agent or an organic reducing agent.

Examples of the sulfur-containing reducing agent in which the oxidation number of sulfur is +4 include: sulfites such as sodium sulfite, potassium sulfite, calcium sulfite, and ammonium sulfite; bisulfites such as sodium bisulfite, potassium bisulfite, and ammonium bisulfite; and pyrosulfites such as sodium pyrosulfite.

Examples of the sulfur-containing reducing agent in which the oxidation number of sulfur is +3 include thiosulfates (dithionites) such as sodium thiosulfate, potassium thiosulfate, ammonium thiosulfate, and magnesium thiosulfate.

Examples of the sulfur-containing reducing agent in which the oxidation number of sulfur is +2 include sulfoxylic acid and salts thereof.

Examples of the sulfur-containing reducing agent that contains an SH group include cysteine and cystine.

Examples of the sulfur-containing organic reducing agent include sulfinic acids and salts thereof. Specific examples of the sulfur-containing organic reducing agent include 2-hydroxy-2-sulfonatoacetic acid, 2-hydroxy-2-sulfonatopropionic acid, 2-hydroxy-2-phosphonatoacetic acid, 2-hydroxy-2-phosphonatopropionic acid, and salts thereof.

The above sulfur-containing reducing agent may be a salt in which an acid group has been neutralized, or may be an acid in which no acid group has been neutralized. However, from the viewpoint of odor, a sulfur-containing reducing agent as a salt is preferable, a water-soluble sulfur-containing reducing agent as a salt is more preferable, and a water-soluble sulfur-containing reducing agent as a salt in which all acid groups have been neutralized is further preferable. Therefore, in a preferable embodiment, the above sulfur-containing reducing agent is a water-soluble salt in which all acid groups have been neutralized. Among these water-soluble salts, sulfites and/or bisulfites are preferable if a residual monomer reducing effect and cost are considered.

The addition amount of a sulfur-containing reducing agent (in the case of using two or more types of sulfur-containing reducing agents in combination, the total amount of the sulfur-containing reducing agents) per 100 parts by mass of the water-absorbent resin to which no sulfur-containing reducing agent aqueous solution has yet been added, is preferably not lower than 0.01 parts by mass, and meanwhile, the addition amount is preferably not higher than 2 parts by mass, more preferably not higher than 1.5 parts by mass, and further preferably not higher than 1.0 part by mass. If the use amount of the sulfur-containing reducing agent is excessively low, a sufficient residual monomer reducing effect may not be obtained. Meanwhile, if the use amount of the sulfur-containing reducing agent is excessively high, not only the addition amount is excessive relative to a desired residual monomer reducing effect, but also physical properties may be reduced. Further, sulfurous odor of the sulfur-containing reducing agent may worsen the odor of the water absorbent agent.

The addition amount of the above sulfur-containing reducing agent aqueous solution per 100 parts by mass of the water-absorbent resin is preferably not lower than 0.1 parts by mass, more preferably not lower than 0.2 parts by mass, and further preferably not lower than 0.5 parts by mass, and meanwhile, the addition amount is preferably not higher than 5 parts by mass, more preferably not higher than 4.5 parts by mass, and further preferably not higher than 4.0 parts by mass. If the addition amount is excessively low, even mixability of the sulfur-containing reducing agent aqueous solution deteriorates. Meanwhile, if the addition amount is excessively high, enormous energy for drying is necessary to adjust the moisture content of the water-absorbent resin or the water absorbent agent after the addition, and, if the drying is performed at high temperature, malodor due to sulfur oxide may be generated. In addition, a higher addition amount makes it more likely for the water-absorbent resin to firmly aggregate. Thus, if pulverization is performed after drying, a surface-crosslinked layer having already been formed is broken, and a desired absorption capacity under load may not be obtained.

The concentration of the sulfur-containing reducing agent in the sulfur-containing reducing agent aqueous solution only has to be adjusted appropriately in consideration of the above contents of the water-absorbent resin and the solubility in water. The concentration of the sulfur-containing reducing agent only has to be adjusted appropriately within a range that allows the residual monomer reducing effect to be obtained. The concentration is preferably not lower than 0.1% by mass, more preferably not lower than 5% by mass, and further preferably not lower than 10% by mass, and meanwhile, the concentration is preferably not higher than the saturation concentration thereof, more preferably not higher than 50% by mass, further preferably not higher than 45% by mass, and particularly preferably not higher than 40% by mass.

The sulfur-containing reducing agent aqueous solution is supplied in droplet form to the water-absorbent resin. If the average droplet diameter is larger than 2.5 mm, the number of droplets per the supply amount of the sulfur-containing reducing agent aqueous solution is reduced. Consequently, the probability of contact with the water-absorbent resin is reduced, and even mixing is not performed. Thus, variation in the residual monomer content among particles of the water absorbent agent occurs. In addition, if the sulfur-containing reducing agent aqueous solution having an average droplet diameter larger than 2.5 mm is mixed by stirring particularly with the water-absorbent resin having a high specific surface area, aggregated coarse particles are easily generated. Therefore, the average droplet diameter is not larger than 2.5 mm, preferably not larger than 1.5 mm, more preferably not larger than 1.0 mm, and further preferably not larger than 0.5 mm. A smaller droplet diameter of the sulfur-containing reducing agent aqueous solution to be supplied contributes more to even mixing between the sulfur-containing reducing agent aqueous solution and the water-absorbent resin but leads to a finer droplet, whereby cost becomes excessively high relative to an effect to be obtained. Thus, the average droplet diameter is preferably not smaller than 10 μm, more preferably not smaller than 30 μm, and further preferably not smaller than 50 μm. As means for supplying the sulfur-containing reducing agent aqueous solution in droplet form, spray means such as a spray nozzle having a desired diameter or a straight pipe having a desired inner diameter can be used.

When the sulfur-containing reducing agent aqueous solution is added to the water-absorbent resin, the temperature of the sulfur-containing reducing agent aqueous solution (specifically, the temperature of droplets thereof) is preferably not lower than 20° C., and meanwhile, the temperature is preferably not higher than 80° C., more preferably not higher than 70° C., and further preferably not higher than 60° C. The sulfur-containing reducing agent aqueous solution having a temperature adjusted to fall within the above range is effective particularly in improving the mixability with the water-absorbent resin having a high specific surface area. If the temperature of the sulfur-containing reducing agent aqueous solution is excessively high, sulfur oxide is generated, and odor is easily generated. In addition, the water of the sulfur-containing reducing agent is easily evaporated, and the sulfur-containing reducing agent easily precipitates, and thus even mixing becomes difficult to perform. Meanwhile, if the above temperature is excessively low, the solubility of the sulfur-containing reducing agent in water is reduced, whereby the concentration in the sulfur-containing reducing agent aqueous solution that can be made is reduced. Thus, when a desired sulfur-containing reducing agent is added, the amount of water to be added is increased. As a result, many aggregated coarse particles in a product (product lumps) may be generated. Therefore, such an excessively low temperature is not preferable. The above temperature range of the aqueous solution is defined as a range of a temperature that is measured before being influenced by the temperature of the water-absorbent resin or the temperature of the device retaining the water-absorbent resin when the sulfur-containing reducing agent aqueous solution is added to the water-absorbent resin.

The temperature of the sulfur-containing reducing agent aqueous solution and the droplet diameter of the aqueous solution may be individually controlled. However, as a result of research by the present inventors on the relationship therebetween, it has been found that: control of the temperature and the droplet diameter in combination within the above suitable ranges is effective particularly in improving the mixability with the water-absorbent resin having a high specific surface area; and the said control causes outstanding effects to be obtained in terms of reduction in the residual monomer content and reduction in variation in the residual monomer content among particle sizes. That is, since a higher temperature of the sulfur-containing reducing agent aqueous solution relative to the water-absorbent resin having a high specific surface area leads to a higher speed of absorption into the water-absorbent resin, reduction in the droplet diameter is effective as a means for achieving more even mixing. Meanwhile, if the temperature of the sulfur-containing reducing agent aqueous solution is excessively increased or the droplet diameter thereof is excessively reduced, the sulfur-containing reducing agent aqueous solution may easily volatilize, and precipitation may easily occur. Thus, each of the temperature and the droplet diameter is preferably controlled within the corresponding range.

A device used for adding the sulfur-containing reducing agent aqueous solution preferably has large mixing force. Specific examples of the mixing device include a cylindrical mixer, a double walled conical mixer, a V-shaped mixer, a ribbon mixer, a screw mixer, a rotary disk mixer, a double-arm kneader, an internal mixer, a pulverizing kneader, a rotary mixer, a screw extruder, a fluidized bed mixer, an airflow mixer, and the like. Further, a device capable of performing mixing by means of stirring is more preferable and exemplified by a high-speed stirring type mixing device and a vertical rotary disk type mixing device. The mixing device is more preferably a high-speed stirring type continuous mixing device and further preferably a horizontal high-speed stirring type continuous mixing device or a vertical high-speed stirring type continuous mixing device. Specifically, the mixing device is exemplified by Schugi mixer (manufactured by HOSOKAWA MICRON CORPORATION), TURBULIZER (manufactured by HOSOKAWA MICRON CORPORATION), Lodige mixer (manufactured by GEBRUDER LODIGE MASCHINENBAU GMBH), and FLOW JET MIXER (manufactured by FUNKEN POW-TECHS INC.). In the case of using a stirring type mixer, the rotation rate thereof is preferably not lower than 5 rpm and more preferably not lower than 10 rpm, and meanwhile, the rotation rate is preferably not higher than 10000 rpm and more preferably not higher than 2000 rpm.

Stirring-mixing between the sulfur-containing reducing agent aqueous solution and the water-absorbent resin is performed so as to satisfy a mathematical expression defined by the following expression (a).

$$\text{Stirring force coefficient} \geq 0.16 \times (\text{average droplet diameter (mm)}) + 0.05 \quad (a)$$

In the above expression (a), the "stirring force coefficient" is a value defined by (Froude number Fr)×(gravitational acceleration g). The stirring force coefficient and the Froude number Fr are values obtained by methods described in EXAMPLES. The average droplet diameter is a value determined according to a nozzle system and the pressure of a droplet supply port of spray means such as a nozzle.

If the stirring force coefficient and the average droplet diameter are adjusted so as to satisfy the above expression (a), the probability of contact between the water-absorbent resin having a high specific surface area and droplets of the sulfur-containing reducing agent aqueous solution is increased. Thus, the residual monomer content of each particle can be efficiency reduced, and variation in the residual monomer content among particle sizes can also be reduced. In addition, generation of aggregated coarse particles in association with stirring-mixing can be suppressed. Therefore, it is desirable to adjust the average droplet diameter of the sulfur-containing reducing agent aqueous solution and the condition of stirring-mixing in consideration of the stirring force coefficient in order to achieve the advantageous effects of the present invention.

0.16 (hereinafter, referred to as a "constant K") and 0.05 (hereinafter, referred to as a "constant L") in the above expression (a) were derived as values for achievement of the advantageous effects of the present invention. The constants were derived by plotting, on a graph, the relationships between droplet diameter (horizontal axis) and stirring force coefficient (vertical axis) that were obtained through a plurality of experiments by the present inventors. In order to exhibit a more excellent effect, the constant K and the constant L can be changed to suitable values in conjunction with each other according to the following expression (a-2).

$$\text{Stirring force coefficient} \geq K \times (\text{average droplet diameter (mm)}) + L \quad (a\text{-}2)$$

Specifically, the constant K is a value selected from within a range of preferably not smaller than 0.16, more preferably not smaller than 0.20, and further preferably not smaller than 0.24, and meanwhile, preferably not larger than 0.25, and the constant L is a value selected from within a range of preferably not smaller than 0.05, more preferably not smaller than 0.10, and further preferably not smaller than 0.12, and meanwhile, preferably not larger than 0.13.

From the viewpoint of further improving the advantageous effects of the present invention, the stirring force coefficient calculated from the above expressions (a) and (a-2) is preferably not smaller than 0.05, more preferably not smaller than 0.10, and further preferably not smaller than 0.15, and meanwhile, the stirring force coefficient is preferably not larger than 100, more preferably not larger than 85, and further preferably not larger than 70. In the present invention, only the constant K and the constant L may be changed to fall within the above suitable ranges, or only the stirring force coefficient may be changed appropriately to fall within the above suitable range. It is also preferable, in terms of obtaining a more excellent effect, to also set the stirring force coefficient to fall within the suitable range as well as setting the constant K and the constant L to fall within the suitable ranges.

The details of the stirring force coefficient will be described in EXAMPLES, and the above stirring force coefficient can be considered as achievement means. For the stirring force coefficient, a stirring blade diameter d only has to be adjusted appropriately within a range of not smaller than 0.05 and not larger than 1.5, a rotation rate N only has to be adjusted appropriately within a range of not lower than 5 and not higher than 1000, a rotation speed n only has to be adjusted appropriately within a range of not lower than 0.08 and not higher than 17, and the Froude number Fr only has to be adjusted appropriately within a range of not smaller than 0.005 and not larger than 11.

When the sulfur-containing reducing agent aqueous solution is added, at least one type of additive selected from the group consisting of other additives such as chelating agents, plant components, antibacterial agents, water-soluble macromolecules, and inorganic salts described later may be contained in the sulfur-containing reducing agent aqueous solution. In this case, the amount of the additive to be contained is appropriately selected as necessary, and is desirably not lower than 0.001% by mass and not higher than 50% by mass with respect to the sulfur-containing reducing agent aqueous solution. As the above chelating agent, chelating agents having high ion sequestering ability or chelation ability for Fe and Cu are preferable. Specifically, examples of the chelating agents include a chelating agent of which the stability constant for Fe ions is not smaller than 10, preferable examples of the chelating agents include a chelating agent of which the stability constant for Fe ions is not smaller than 20, further preferable examples of the chelating agents include an amino-polycarboxylic acid and a salt thereof, and particularly preferable examples of the chelating agents include an amino carboxylic acid having 3 or more carboxyl groups and a salt thereof. Specific examples of these polycarboxylic acids include diethylenetriaminepentaacetic acid, triethylenetetraaminehexaacetic acid, cyclohexane-1,2-diamine tetraacetic acid, N-hydroxyethylethylenediaminetriacetic acid, ethylene glycol diethyl ether diamine tetraacetic acid, ethylenediamine tetrapropionic acetic acid, N-alkyl-N'-carboxymethyl aspartic acid, N-alkenyl-N'-carboxymethyl aspartic acid, and alkali metal salts, alkali earth metal salts, ammonium salts, and amine salts thereof. The salts may result from complete neutralization, may result from partial neutralization, or may be mixtures. Among these polycarboxylic acids, diethylenetriaminepentaacetic acid, triethylenetetraaminehexaacetic acid, N-hydroxyethylethylenediaminetriacetic acid, and salts thereof are most preferable. The use amount thereof per 100 parts by mass of the water-absorbent resin is preferably not lower than 0.00001 parts by mass and more preferably not lower than 0.0001 parts by mass, and meanwhile, the use amount is preferably not higher than 10 parts by mass and more preferably not higher than 1 part by mass.

For exhibiting deodorization property, the above plant component can be blended such that the amount thereof per 100 parts by mass of the water-absorbent resin is within a range of preferably not lower than 0 parts by mass, more preferably not lower than 0.001 parts by mass, and further preferably not lower than 0.002 parts by mass, and meanwhile, preferably not higher than 10 parts by mass, more preferably not higher than 5 parts by mass, and further preferably not higher than 3 parts by mass. The plant component is preferably at least one type of compound selected from among polyphenols, flavones and analogs thereof, and caffeine. The plant component is more preferably at least one type of compound selected from among tannin, tannic acid, gall, nutgall, and gallic acid. The above antibacterial agent is a conventionally known antibacterial agent having antibacterial property, and examples of the antibacterial agent include antibacterial agents described in Japanese Laid-Open Patent Publication No. H11-267500.

[2-8-2] Heating and Drying Treatment

It is desirable to perform heating and drying treatment on the above water-absorbent resin to and with which the sulfur-containing reducing agent aqueous solution has been added and mixed. The heating and drying treatment is performed such that the moisture content of the water absorbent agent is preferably higher than 0% by mass and not higher than 10% by mass. The moisture content of the water absorbent agent is more preferably not lower than 0.5% by mass and further preferably not lower than 1.0% by mass, and meanwhile, the moisture content is more preferably not higher than 9% by mass. The moisture content of the water absorbent agent is measured by a method described below in EXAMPLES. In the case where the sulfur-containing reducing agent aqueous solution is added and mixed before, simultaneously with, or after the addition of the surface-crosslinking agent in the step of adding the surface-crosslinking agent to the pre-surface-crosslinking water-absorbent resin, the subsequent heating step performed in the surface-crosslinking step may be regarded as the above heating and drying treatment step.

Air flow of hot air or the like is used as a heat medium for the heating. The heating temperature, e.g., the temperature of the heat medium or a material, is preferably not lower than 40° C. and more preferably not lower than 50° C., and meanwhile, the heating temperature is preferably not higher than 150° C. and more preferably not higher than 140° C. The heating time in the temperature range is preferably not shorter than 1 minute and not longer than 2 hours. Combination between the heating temperature and the heating time only has to be such that adjustment to the above moisture content can be made, and is suitably not shorter than 0.1 hours and not longer than 1.5 hours at 60° C. If the heating temperature is excessively low or the heating time is excessively short, the surface of the obtained water absorbent agent is in a humidified state, whereby the water absorbent agent has strong adhesiveness and may be difficult to handle as powder. Meanwhile, if the heating temperature is excessively high or the heating time is excessively long, the heating and drying treatment not only becomes energetically uneconomical but also sometimes results in intensification of malodor due to sulfur oxide which is a pyrolysate of the sulfur-containing reducing agent.

The addition and mixing of the above sulfur-containing reducing agent aqueous solution and the subsequent heating and drying treatment may be performed by the same device or different devices. The device to be used is exemplified by the above device and only has to adjust, for example, a heat medium such as gas or conducted electric heat such that the internal temperature of the device is set to the above temperature. In the case of heating, the water-absorbent resin may be stirred or may be left at rest, i.e., may not be stirred, as long as the temperature and the moisture content can be controlled to fall within the predetermined ranges. The temperature of the water-absorbent resin at the time of adding the sulfur-containing reducing agent aqueous solution is preferably not higher than 150° C., and meanwhile, the temperature is preferably not lower than 40° C. and more preferably not lower than 50° C. As described above, if the temperature of the water-absorbent resin is excessively low, the adhesiveness of the water absorbent agent may become strong. Meanwhile, if the temperature of the water-absorbent resin is excessively high, problems such as malodor may arise. The water-absorbent resin to and with which the sulfur-containing reducing agent aqueous solution has been added and mixed is preferably heated and cured at the above preferable heating temperature within a range of not lower than 40° C. and not higher than 150° C. At the heating temperature, heating and drying treatment only has to be performed while the heating time is adjusted appropriately within a range of preferably not shorter than 1 minute and more preferably not shorter than 5 minutes, and meanwhile, preferably not longer than 2 hours and more preferably not longer than 1.5 hours. In the case where the heating and drying treatment is performed while the water-absorbent resin is left at rest, the heating and drying treatment may be performed with the water-absorbent resin being laminated to have a thickness that is preferably not smaller than 1 cm, more preferably not smaller than 5 cm, and further preferably not smaller than 10 cm, and meanwhile, preferably not larger than 100 cm, more preferably not larger than 80 cm, and further preferably not larger than 70 cm. The water-absorbent resin having been cured can be, as necessary, pulverized or classified to become a water absorbent agent having a desired particle size. The curing refers to an operation of eliminating the wettability of the surface of the water absorbent agent and forming the water absorbent agent into powder form by the above heating and drying treatment step.

As the physical properties of the water-absorbent resin at the time of adding the sulfur-containing reducing agent aqueous solution, the above physical properties are preferably satisfied. For example, the above conditions (i) to (iv) are applicable. In particular, it is more preferable that, in a particle size distribution of the water-absorbent resin, the mass-average particle diameter D50 falls within the range in the above condition (ii) and the proportion of the particles smaller than 150 μm falls within the range in the above condition (i).

[2-9] Other Steps

In the present invention, a granulating step, a sizing step, a fine powder removing step, a fine powder collecting step, a fine powder recycling step, an iron removing step, and the like can be performed, as necessary, in addition to the above steps. In addition, the present invention may further include at least one type of step selected from among a transporting step, a storing step, a packing step, a keeping step, and the like.

The above granulating step may be, for example, a step of making the fine powder, which has been obtained in the fine powder collecting step, into a hydrous gel. The above sizing step includes: a step of classifying and removing a fine powder subsequently to the surface-crosslinking step; a step of performing classification and pulverization if the water-absorbent resin aggregates so as to have a size larger than a desired size; and the like. The above fine powder recycling step may be a step of adding a fine powder to the hydrous gel or the like which is a raw material in any of the steps in the manufacturing process for the water-absorbent resin, the addition being performed directly or after the fine powder is made into a large hydrous gel by the above granulating step.

For example, the particles having particle diameters smaller than 150 μm may be separated and removed from the water absorbent agent having been subjected to the heating and drying treatment, and the removed particles may be recycled in the manufacturing process for the water-absorbent resin. The fine powder recycling step preferably includes separating, after performing the above curing, the particles having particle diameters smaller than 150 μm and returning the particles smaller than 150 μm to the manufacturing process for the water-absorbent resin, to recycle the particles as a raw material for the water-absorbent resin. The fine powder recycling step preferably includes supplying the fine particles to a step preceding to drying.

The water absorbent agent having been subjected to the heating and drying treatment may be stored in a storing tank. The present invention preferably includes, after the heating and drying step and preferably after the above curing, a step of retaining the obtained water absorbent agent in a storing tank for not shorter than 1 minute and not longer than 20 hours. If the water absorbent agent is temporarily stored in the storing tank, odor and a residual monomer that are residual in the water absorbent agent can be removed during the storing. The retaining time in the storing tank is more preferably not shorter than 5 minutes and further preferably not shorter than 10 minutes, and meanwhile, the retaining time is more preferably not longer than 18 hours and further preferably not longer than 15 hours. An excessively long retaining time in the storing tank requires the size of the storing tank to be excessively large relative to production quantity, and thus is economically disadvantageous. Meanwhile, an excessively short retaining time in the storing tank makes it impossible for the storing tank to sufficiently exhibit an odor reduction effect. Thus, it is preferable to make adjustments within the above range. Slight reduction in the internal pressure of the storing tank makes it possible to further reduce odor that is remaining in the water absorbent agent, and thus is preferable.

The present invention can include, after the above step of retaining the water absorbent agent in the storing tank, a step of filling a product shipping container with the water absorbent agent. A predetermined amount of the water absorbent agent is separated from the storing tank, and a bag or a container is filled with the separated water absorbent agent as a final product. By retaining the water absorbent agent in the storing tank as described above, a water absorbent agent having a further reduced odor can be shipped.

[3] WATER-ABSORBENT RESIN AND WATER ABSORBENT AGENT

The water absorbent agent manufactured as described above is regarded as a final product if the water absorbent agent is in a state of being able to be shipped. The water absorbent agent of the present invention is a water absorbent agent containing a sulfur-containing reducing agent and having a water-absorbent resin as a main component. The water absorbent agent includes a particle having a particle diameter smaller than 300 μm, a particle having a particle diameter not smaller than 300 μm and smaller than 500 μm, and a particle having a particle diameter not smaller than 500 μm. The water absorbent agent has a specific surface area not lower than 25 m$^2$/kg. The water absorbent agent has a sulfur-containing reducing agent dispersity not larger than 28, the sulfur-containing reducing agent dispersity being defined in the following expression (b).

[3-1] Specific Surface Area

If the specific surface area of the water absorbent agent is set to be not lower than 25 m$^2$/kg, a more excellent Vortex-method-based water absorption time is obtained. A higher specific surface area of the water absorbent agent is more preferable, and the specific surface area is preferably not lower than 26 m$^2$/kg, not lower than 27 m$^2$/kg, not lower than 28 m$^2$/kg, not lower than 29 m$^2$/kg, and not lower than 30 m$^2$/kg in this order. Meanwhile, the specific surface area is preferably not higher than 50 m$^2$/kg and not higher than 45 m$^2$/kg in this order. Although a higher specific surface area is more desirable from the viewpoint of shortening the water absorption time, excessive increase in the specific surface area makes it necessary to perform excessive foaming polymerization in the polymerization step and excessively fine gel pulverization in the gel pulverization step, resulting in a concern in terms of absorption capacity under load (AAP). Meanwhile, excessive reduction in the specific surface area of the water absorbent agent makes it less likely to obtain a water absorbent agent having a desired water absorption time (Vortex), and thus is not preferable.

In the present specification, the "specific surface area" means the surface area (unit: m$^2$/kg) per unit mass of the water absorbent agent or the water-absorbent resin, and can be obtained by analyzing, with use of high-speed three-dimensional analyzing software (TRI/3D-VOL-FCS64 manufactured by Ratoc System Engineering Co., Ltd.), three-dimensional image data of the water absorbent agent or the water-absorbent resin acquired by using a micro-focus X-ray CT system (inspeXio SMX-100CT manufactured by Shimadzu Corporation) described later. For the details of measurement conditions, explanations in EXAMPLES are referred to. If there is any water absorbent agent or water-absorbent resin to which the X-ray CT method is not applicable, a gas absorption (BET) method is applicable. If it is also difficult to apply the gas absorption (BET) method, an air infiltration method, a mercury press-in method, or the like is applicable.

[3-2] Sulfur-Containing Reducing Agent Dispersity

The water absorbent agent of the present invention has a sulfur-containing reducing agent dispersity not larger than 28. The sulfur-containing reducing agent dispersity is a value obtained by classifying, according to particle sizes, the water absorbent agent into (i) a water absorbent agent having a particle diameter not smaller than 500 μm, (ii) a water absorbent agent having a particle diameter smaller than 500 μm and not smaller than 300 μm, and (iii) a water absorbent agent having a particle diameter smaller than 300 μm, and applying, in the following expression (b), a standard deviation σ1 among sulfur-containing reducing agent contents (% by mass) A1 to A3 for the respective particle sizes.

$$\text{(Sulfur-containing reducing agent dispersity)} = \sigma 1 / \text{(sulfur-containing reducing agent content of water absorbent agent)} \times 100 \quad \text{(b)}$$

The classification into the above particle sizes (i) to (iii) is made because the absorption speed for the sulfur-containing reducing agent aqueous solution significantly differs among these particle sizes so that problems arise in terms of variation in the residual monomer content.

A lower sulfur-containing reducing agent dispersity indicates that: variation in the sulfur-containing reducing agent content among the above particle sizes of the water absorbent agent is smaller; and the sulfur-containing reducing agent is more evenly dispersed and mixed. Thus, the residual monomer content of the water absorbent agent is low, and variation in the residual monomer content among the particle sizes of the water absorbent agent is also small. In addition, even if particle size-based segregation of the water absorbent agent occurs in a manufacturing line for absorbent articles, variation in the residual monomer content among water absorbent agents provided in respective absorbent articles is suppressed. The sulfur-containing reducing agent dispersity is not larger than 28, preferably not larger than 26, and further preferably not larger than 24. Meanwhile, if the sulfur-containing reducing agent dispersity is larger than 28, variation in the monomer residue amount among particle sizes of the water absorbent agent increases. Thus, if particle size-based segregation of the water absorbent agent occurs in a manufacturing line for absorbent articles, only a water absorbent agent having a high residual monomer content may be provided in an absorbent article, whereby problems may arise in terms of hygiene and odor.

[3-3] Relationship Between Water-Absorbent Resin and Water Absorbent Agent

The amount of the water-absorbent resin contained in the water absorbent agent with respect to the entire water absorbent agent amount is preferably not lower than 95% by mass, more preferably not lower than 98% by mass, and most preferably not lower than 99% by mass, and may be 100% by mass. In the case where the amount is not 100% by mass, the remaining components can include, for example, the above various additives.

[3-4] Characteristics of Water Absorbent Agent

The water absorbent agent of the present invention preferably has at least one of the following characteristics (a) to (j):

(a) the mass-average particle diameter D50; (b) the proportion of the particles having particle diameters smaller than 150 μm; (c) the absorption capacity under no load (CRC); (d) the absorption capacity under load (AAP); (e) the moisture content; (f) the water absorption time (Vortex method); (g) the residual monomer content; (h) the sulfur-containing reducing agent content; (i) the residual monomer variation rate; and (j) the amount of aggregated coarse particles in a product (product lump amount).

Any two or more of the above characteristics (a) to (j) may be combined. It is preferable that at least the characteristics (f) and (g) are combined, and it is more preferable that the characteristics (a) and (b) are combined in addition to these characteristics. It is further preferable that the characteristics (c) and/or (d) may be combined in addition to these characteristics, and the characteristics (i) and/or (j) may be combined in addition to these characteristics. It is most preferable that all of the characteristics (a) to (j) are combined.

[3-4-1] Mass-Average Particle Diameter D50

The mass-average particle diameter D50 of the water absorbent agent is preferably not smaller than 250 μm, more preferably not smaller than 270 μm, and further preferably not smaller than 300 μm, and meanwhile, the mass-average particle diameter D50 is preferably not larger than 550 μm, more preferably not larger than 500 μm, and further preferably not larger than 450 μm. If the mass-average particle diameter D50 of the water absorbent agent is set to fall within the above range, the absorption capacity under load (AAP) and the Vortex-method-based water absorption time which are preferable absorption characteristics can be controlled in a further balanced manner. If the mass-average particle diameter D50 is excessively small, a gel bulk density may be excessively increased, or the absorption capacity under load (AAP) which is a preferable absorption characteristic may be excessively reduced. Meanwhile, if the mass-average particle diameter D50 is excessively large, the Vortex-method-based water absorption time which is a preferable absorption characteristic may become long. In addition, the coarseness of the particles of the water absorbent agent stands out. Thus, when the water absorbent agent is used for an absorbent article such as a disposable diaper or a sanitary napkin, the texture or the feel of wearing may be worsened. For detailed measurement conditions, EXAMPLES are referred to.

[3-4-2] Proportion of Particles Having Particle Diameters Smaller than 150 μm

The proportion of the particles smaller than 150 μm in 100% by mass of the water absorbent agent is preferably not higher than 3% by mass, more preferably not higher than 2% by mass, further preferably not higher than 1% by mass, and particularly preferably 0% by mass. It is noted that, in continuous commercial production, it is sometimes very difficult to set the proportion of the particles smaller than 150 μm to be 0% by mass from the viewpoint of production efficiency. Thus, the proportion is preferably not lower than 0.1% by mass, more preferably not lower than 0.2% by mass, and further preferably not lower than 0.3% by mass.

If the proportion of the particles smaller than 150 μm is set to fall within the above range, it becomes easier to control the absorption capacity under load (AAP) and the Vortex-method-based water absorption time in a balanced manner. An excessively high proportion of the particles smaller than 150 μm may not only lead to excessive reduction in the absorption capacity under load (AAP) which is a preferable absorption characteristic but also cause a working environment to be worsened owing to scattering of dust in a place where the water absorbent agent is handled and cause handleability to deteriorate owing to accumulation of fine particles in a device, and thus is not preferable.

In addition, it is preferable that: the mass-average particle diameter of the water absorbent agent is not smaller than 250 μm and not larger than 550 μm; and the proportion of the particles having particle diameters smaller than 150 μm is not higher than 3% by mass. It is more preferable that the water absorbent agent satisfies the above range of the mass-average particle diameter D50 and satisfies the above range of the proportion of the particles smaller than 150 μm. By satisfying both ranges, the above effects are synergistically obtained. The mass-average particle diameter D50 of the water absorbent agent and the proportion of the particles smaller than 150 μm are measured by methods described in EXAMPLES.

In addition, the water absorbent agent of the present invention preferably includes three particle size fractions, i.e., a particle size fraction "smaller than 300 μm", a particle size fraction "not smaller than 300 μm and smaller than 500 μm", and a particle size fraction "not smaller than 500 μm" distinguished in sieve classification. In each particle size fraction, the proportion is preferably not lower than 1% by mass and more preferably not lower than 5% by mass.

[3-4-3] Absorption Capacity Under No Load (CRC)

The absorption capacity under no load (CRC) of the water absorbent agent is preferably not lower than 25 g/g, and meanwhile, the CRC is preferably not higher than 40 g/g, more preferably not higher than 38 g/g, further preferably not higher than 35 g/g, particularly preferably not higher than 32 g/g, and most preferably not higher than 30 g/g.

If the above absorption capacity under no load (CRC) is excessively low, the absorption capacity of the water absorbent agent is reduced, whereby the water absorbent agent may be unsuitable for being used for an absorber of an absorbent article such as a disposable diaper or a sanitary napkin. Meanwhile, if the above absorption capacity under no load (CRC) is excessively high, the gel strength may be weakened.

[3-4-4] Absorption Capacity Under Load (AAP)

The "AAP" is an abbreviation for Absorption Against Pressure and means the absorption capacity under load of the water absorbent agent. For detailed measurement conditions, EXAMPLES are referred to.

The absorption capacity under load (AAP) (specifically, under a load of 4.83 kPa) of the water absorbent agent is preferably not lower than 20 g/g, more preferably not lower than 21 g/g, further preferably not lower than 22 g/g, and particularly preferably not lower than 23 g/g, and meanwhile, the AAP is preferably not higher than 30 g/g and more preferably not higher than 28 g/g.

If the absorption capacity under the load (AAP) is set to fall within the above range, a liquid return amount at application of load to the absorber can be further reduced, whereby the water-absorbent resin or the water absorbent agent becomes suitable for being used for an absorber of an absorbent article such as a disposable diaper or a sanitary napkin.

[3-4-5] Moisture Content

The moisture content of the water absorbent agent is preferably higher than 0% by mass, more preferably not lower than 0.5% by mass, and further preferably not lower than 1.0% by mass, and meanwhile, the moisture content is preferably not higher than 10% by mass and more preferably not higher than 9% by mass. In the present invention, the moisture content of the water absorbent agent is obtained from a drying loss when the water absorbent agent has been dried for 3 hours at 180° C. For detailed measurement conditions, EXAMPLES are referred to.

[3-4-6] Vortex-Method-Based Water Absorption Time

A Vortex-method-based water absorption time is a physical property defined in the Japanese Industrial Standard JIS K 7224 (1996), and is defined as a time taken until a predetermined amount, i.e., 50 g, of a 0.9%-by-mass aqueous solution of sodium chloride is absorbed by 2 g of the water absorbent agent or the water-absorbent resin. For detailed measurement conditions, EXAMPLES are referred to.

The Vortex-method-based water absorption time of the water absorbent agent is preferably not longer than 45 seconds, more preferably not longer than 40 seconds, and further preferably not longer than 35 seconds, and meanwhile, the Vortex-method-based water absorption time is preferably longer than 10 seconds and more preferably not shorter than 15 seconds.

If the above Vortex-method-based water absorption time is excessively long, the obtained water absorbent agent has a long water absorption time for a body fluid such as urine or blood or the like and is unsuitable for an absorber of an absorbent article such as a disposable diaper. The Vortex-method-based water absorption time can be controlled with foaming polymerization, a particle size distribution, or the like.

[3-4-7] Residual Monomer Content

A residual monomer content (Amount of Residual Acrylate Monomers) is the amount of monomers that are unreacted acrylic acid and a salt thereof in the water absorbent agent or the water-absorbent resin. For detailed measurement conditions, EXAMPLES are referred to.

From the viewpoint of safety, the residual monomer content of the water absorbent agent with respect to the entire amount of the water absorbent agent in the present invention is preferably not higher than 500 ppm (on a mass basis, the same applies below), more preferably not higher than 400 ppm, and further preferably not higher than 300 ppm, and meanwhile, the residual monomer content is preferably not lower than 0 ppm, more preferably higher than 0 ppm, and further preferably not lower than 10 ppm.

Setting of the above residual monomer content to fall within the above range leads to further alleviation of stimulation to the skin of a human body and the like. Meanwhile, an excessively high residual monomer content may cause the residual monomers to emit unpleasant odor at the time of gel swelling, and thus is not preferable.

[3-4-8] Sulfur-Containing Reducing Agent Content

The sulfur-containing reducing agent content of the above water absorbent agent is preferably higher than 0% by mass and not higher than 1% by mass. The amount of a sulfur-based volatile component contained in the water absorbent agent defined in a measurement method described later is more preferably not higher than 0.8% by mass and further preferably not higher than 0.7% by mass, and meanwhile, the amount is more preferably not lower than 0.01% by mass and further preferably not lower than 0.05% by mass. For detailed measurement conditions, EXAMPLES are referred to.

If a large amount of the sulfur-based volatile component is detected, odor that is derived from the sulfur-containing reducing agent added in the above step has been generated from the gel having swelled. In this case, actual use for an absorbent article leads to perception, by the wearer, of discomfort and is not preferable also in terms of hygiene.

[3-4-9] Residual Monomer Variation Rate

The residual monomer variation rate of the water absorbent agent is a value obtained from expression (7) described in EXAMPLES. The value is preferably not larger than 20, more preferably not larger than 18, and further preferably not larger than 16, and meanwhile, the value is preferably not smaller than 1, more preferably not smaller than 3, and further preferably not smaller than 6.

By reduction in the residual monomer variation rate, even if particle size-based segregation of the water absorbent agent occurs in a manufacturing line for absorbent articles, variation in the residual monomer content among water absorbent agents provided in respective absorbent articles is suppressed.

[3-4-10] Amount of Aggregated Coarse Particles in Product

The amount of aggregated coarse particles to be removed from the water absorbent agent, e.g., a product lump amount, is preferably not higher than 2.0% by mass and more preferably not higher than 1.5% by mass. If there are excessively many aggregated coarse particles, most of the sulfur-containing reducing agent aqueous solution having been added are contained in the aggregated coarse particles. Thus, the sulfur-containing reducing agent aqueous solution added to, for example, particles not larger than 850 μm is significantly reduced, whereby an appropriate sulfur-containing reducing agent dispersity may not be obtained. For detailed measurement conditions, EXAMPLES are referred to.

The form of the water absorbent agent of the present invention may be any of a spherical form, a granulated material form, an aggregate form, an indefinite pulverized form, and the like. However, if the water absorption time is considered, an indefinite pulverized form is preferable.

[4] USE OF WATER ABSORBENT AGENT

It is preferable that the water absorbent agent according to the present invention is mainly used for an absorber or an absorption layer (hereinafter, collectively referred to as "absorber") of an absorbent article such as a disposable diaper or a sanitary napkin. It is more preferable that the water absorbent agent is used for an absorber of an absorbent article such that the use amount of the water absorbent agent per absorbent article is large.

The above absorber means a product obtained by shaping the particulate water absorbent agent into a sheet form, a fiber form, a tubular form, or the like, and the particulate water absorbent agent is preferably shaped into a sheet form, to be an absorption layer. In addition to the water absorbent agent according to the present invention, an absorbent material such as pulp fibers, an adhesive, a nonwoven fabric, and the like may also be used in combination for the shaping. In this case, the amount of the water absorbent agent in the absorber (hereinafter, written as a "core concentration") is preferably not lower than 50% by mass, more preferably not lower than 60% by mass, further preferably not lower than 70% by mass, and particularly preferably not lower than 80% by mass, and meanwhile, the core concentration is preferably not higher than 100% by mass.

If the core concentration is set to fall within the above range, use of the above absorber for an absorbent article enables, even when the water absorbent agent is made into a gel by absorbing urine, appropriate spaces to be formed among particles of the gel.

[5] ABSORBENT ARTICLE

An absorbent article according to the present invention includes the above absorber and ordinarily has a liquid permeable front surface sheet and a liquid non-permeable back surface sheet. Examples of the absorbent article include disposable diapers, sanitary napkins, and the like.

In the case where the absorbent article is, for example, a disposable diaper, the disposable diaper is made by interposing an absorber containing the water absorbent agent of the present invention between a liquid permeable top sheet located so as to come into contact with the skin of a person when the disposable diaper is worn and a liquid non-permeable back sheet located outward when the disposable diaper is worn. The disposable diaper is further provided with a member known to a person skilled in the art, such as adhesive tape for fixing the disposable diaper after being worn.

In the absorbent article according to the present invention, when the absorber absorbs a liquid and the water absorbent agent swells and is made into a gel, appropriate spaces are formed among particles of the gel and pleasant aroma is emitted through the spaces. Thus, an absorption article comfortable to a wearer and his/her care giver can be provided.

The water absorbent agent according to the present invention can be suitably used for, besides the above disposable diaper and sanitary napkin, a pet urine absorbing agent, a urine gelling agent for portable toilets, or the like.

In the present invention, measurement methods for the above physical properties are based on measurement methods described in EXAMPLES, unless otherwise specified.

The present application claims priority to Japanese Patent Application No. 2019-003362 filed on Jan. 11, 2019, the entire contents of which are incorporated herein by reference.

EXAMPLES

Hereinafter, the present invention will be more specifically described by means of examples. However, the present invention is not limited by the following examples, and, as a matter of course, can also be carried out with appropriate modifications being made within the scope of the gist described above and below, and any of these modifications are included in the technical scope of the present invention.

Production of Water-Absorbent Resin

Production Example 1

A water-absorbent resin (1) was produced under the following production conditions with reference to production example 3 described in International Publication No. 2006/088115 (Patent Literature 1).

Monomer Solution Preparation Step 1.8 parts by mass of polyethylene glycol diacrylate (n=9) was dissolved in 1990 parts by mass of an aqueous solution of sodium acrylate having a neutralization ratio of 70 mol % (monomer concentration: 35% by mass), whereby an aqueous solution (1) was made.

Polymerization Step

The above aqueous solution (1) was poured into a vat made of stainless steel and having a size with a length of 320 mm, a width of 220 mm, and a height of 50 mm. At this time, the height of the aqueous solution (1) was 23 mm. An upper portion of the vat made of stainless steel was sealed with a polyethylene film having a nitrogen introduction port, a discharge port, and a polymerization initiator supply port. Then, the vat was put in a water bath at 30° C., and, while the temperature of the aqueous solution (1) was kept at 30° C., nitrogen gas was introduced into the aqueous solution (1) to remove dissolved oxygen in the solution. Also thereafter, nitrogen gas continued to be introduced through the upper portion space of the reaction container and continued to be discharged from the opposite side.

1.5 parts by mass of a 10%-by-mass aqueous solution of 2,2'-azobis(2-amidinopropane)dihydrochloride, 1.5 parts by mass of a 10%-by-mass aqueous solution of sodium persulfate, 2.8 parts by mass of a 1%-by-mass aqueous solution of L-ascorbic acid, and 0.4 parts by mass of a 3.5%-by-mass aqueous solution of hydrogen peroxide, were poured, and sufficient mixing was performed by using a magnetic stirrer. Polymerization was initiated 1 minute after the supply of the polymerization initiators, and immersion was performed such that the vat made of stainless steel was immersed in a water bath having a liquid temperature of 12° C. down to a height of 10 mm from the bottom of the vat. The immersion was intermittently repeated to control the polymerization temperature. A polymerization peak of 74° C. was obtained 12 minutes after the initiation of the polymerization, and the vat made of stainless steel was immersed in a water bath having a liquid temperature of 60° C. down to a height of 10 mm from the bottom of the vat and was retained for 20 minutes, to age a gel. Consequently, a crosslinked polymer in the form of a hydrous gel (hereinafter, written as a "hydrous gel") (1) was obtained.

Gel Pulverization Step

Next, the above hydrous gel (1) was cut into an appropriate size and pulverized with a meat chopper equipped with a die having a bore diameter of 9.5 mm, whereby a particulate hydrous gel (1) was obtained. The mass-average particle diameter of the obtained particulate hydrous gel (1) is indicated in Table 1.

Drying Step

Next, the above particulate hydrous gel (1) was placed, in a spread manner, on a wire mesh having a mesh opening size of 300 μm, and the wire mesh was put into a hot air drying machine. Then, hot air at 190° C. was caused to flow for 30 minutes so that the particulate hydrous gel (1) was dried, whereby a dried polymer (1) was obtained.

Classification Step

Subsequently, the dried polymer (1) was put in a roll mill, pulverized and then, classified by using two types of JIS standard sieves having mesh opening sizes of 850 μm and 150 μm, whereby a pre-surface-crosslinking water-absorbent resin (1) having an indefinite pulverized form was obtained. The various physical properties of the obtained pre-surface-crosslinking water-absorbent resin (1) are indicated in Table 2.

Surface-Crosslinking Step

Next, a surface-crosslinking agent aqueous solution formed from 1.0 part by mass of propylene glycol, 0.03 parts by mass of ethylene glycol diglycidyl ether, 1.0 part by mass of isopropyl alcohol, and 3.0 parts by mass of deionized water was added to and evenly mixed with 100 parts by mass of the above pre-surface-crosslinking water-absorbent resin (1). Subsequently, the mixture was heated for 40 minutes at 195° C. and then crushed until the mixture passed through the JIS standard sieve having a mesh opening size of 850 μm, whereby a post-surface-crosslinking water-absorbent resin (1) was obtained. The various physical properties of the obtained post-surface-crosslinking water-absorbent resin (1) are indicated in Table 3.

The specific surface area of each of the pre-surface-crosslinking water-absorbent resin (1) and the post-surface-crosslinking water-absorbent resin (1) was 22 $m^2/kg$.

Production Example 2

A water-absorbent resin (2) was produced by foaming polymerization and gel pulverization which were not disclosed in International Publication No. 2006/088115 (Patent Literature 1).

Monomer Aqueous Solution Preparation Step 352.0 parts by mass of acrylic acid, 145.1 parts by mass of a 48%-by-mass aqueous solution of sodium hydroxide, 2.3 parts by mass of polyethylene glycol diacrylate (n=9), 96.0 parts by mass of a 0.1%-by-mass aqueous solution of trisodium diethylenetriamine pentaacetate, 6.6 parts by mass of a 1.0%-by-mass aqueous solution of polyoxyethylene (20) sorbitan monostearate (manufactured by Kao Corporation), and 238.0 parts by mass of deionized water, were poured into a container having a volume of 2 L and made from polypropylene, and were mixed with one another, whereby an aqueous solution (2) was made. The deionized water had been heated to 40° C. in advance.

Polymerization Step

Subsequently, the above aqueous solution (2) was cooled while being stirred. At a time point at which the liquid temperature of the aqueous solution (2) became 53° C., 148.9 parts by mass of a 48%-by-mass aqueous solution of sodium hydroxide was added to and mixed with the aqueous solution (2) for about 30 seconds in a state open to the atmosphere, whereby a monomer aqueous solution (2) was prepared. The temperature of the monomer aqueous solution (2) had been increased to about 84° C. owing to heat of neutralization and heat of dissolution generated in the course of the above mixing.

Then, at a time point at which the temperature of the above monomer aqueous solution (2) became 83° C., 15.3 parts by mass of a 3.8%-by-mass aqueous solution of sodium persulfate was added as a polymerization initiator, and the monomer aqueous solution (2) was stirred for about 5 seconds, whereby a reaction liquid (2) was made.

Next, the above reaction liquid (2) was poured, in a state open to the atmosphere, into a vat type container (bottom surface: 340×340 mm, height: 25 mm, inner surface: coated with Teflon (registered mark)) made of stainless steel. The vat type container had been heated such that the surface temperature thereof was 40° C. by using a hot plate (NEO HOTPLATE HI-1000 manufactured by AS ONE Corporation).

After the above reaction liquid (2) was poured into the above vat type container, a polymerization reaction was initiated 20 seconds later. The polymerization reaction progressed while, by the polymerization reaction, the reaction liquid (2) expanded and foamed toward the upper side in all directions while generating steam. Then, the resultant substance contracted to a size slightly larger than that of the bottom surface of the vat type container. The polymerization reaction (expansion and contraction) ended within about 1 minute. After the elapse of 3 minutes from the initiation of the polymerization reaction, a hydrous gel (2) was taken out.

Gel Pulverization Step

Next, the above hydrous gel (2) was cut into an appropriate size and then supplied into a meat chopper that included, at an end portion thereof, a multi-bore plate having a diameter of 100 mm, a bore diameter of 12.5 mm, 18 bores, an opening ratio of 28%, and a thickness of 10 mm, and that had a screw shaft outer diameter of 86 mm, a screw shaft rotation rate of 130 rpm, and a casing inner diameter of 88 mm. Gel pulverization was performed with the meat chopper, whereby a particulate hydrous gel (2) was obtained. The mass-average particle diameter of the obtained particulate hydrous gel (2) is indicated in Table 1.

Drying Step

Next, the above particulate hydrous gel (2) was placed, in a spread manner, on a wire mesh having a mesh opening size of 300 μm, and the wire mesh was put into the hot air drying machine. Then, hot air at 180° C. was caused to flow for 30 minutes so that the particulate hydrous gel (2) was dried, whereby a dried polymer (2) was obtained.

Classification Step

Subsequently, the dried polymer (2) was put in a roll mill (WML type roll pulverizer manufactured by Inokuchi Giken Ltd.), pulverized, and then classified by using two types of JIS standard sieves having mesh opening sizes of 710 μm and 150 μm, whereby a pre-surface-crosslinking water-absorbent resin (2) having an indefinite pulverized form was obtained. The various physical properties of the obtained pre-surface-crosslinking water-absorbent resin (2) are indicated in Table 2.

Surface-Crosslinking Step

Next, a surface-crosslinking agent solution formed from 0.5 parts by mass of 1,4-butanediol, 0.8 parts by mass of propylene glycol, and 4.0 parts by mass of deionized water was added to and evenly mixed with 100 parts by mass of the above pre-surface-crosslinking water-absorbent resin (2). Subsequently, the mixture was heated for 25 minutes at 180° C. and then crushed until the mixture passed through a JIS standard sieve having a mesh opening size of 850 μm, whereby a post-surface-crosslinking water-absorbent resin (2) was obtained. The various physical properties of the obtained post-surface-crosslinking water-absorbent resin (2) are indicated in Table 3.

The specific surface area of each of the pre-surface-crosslinking water-absorbent resin (2) and the post-surface-crosslinking water-absorbent resin (2) was 29 m$^2$/kg.

Production Example 3

A water-absorbent resin (3) was produced by foaming polymerization and gel pulverization which were not disclosed in International Publication No. 2006/088115 (Patent Literature 1).

Monomer Aqueous Solution Preparation Step 423.7 parts by mass of acrylic acid, 140.0 parts by mass of a 48%-by-mass aqueous solution of sodium hydroxide, 1.9 parts by mass of polyethylene glycol diacrylate (n=9), 2.6 parts by mass of a 0.1%-by-mass aqueous solution of trisodium diethylenetriamine pentaacetate, and 396.0 parts by mass of deionized water, were poured into a container having a volume of 2 L and made from polypropylene, and were mixed with one another, whereby an aqueous solution (3) was made. The deionized water had been heated to 40° C. in advance.

Polymerization Step

Subsequently, the above aqueous solution (3) was cooled while being stirred. At a time point at which the liquid temperature of the aqueous solution (2) became 39° C., 211.9 parts by mass of a 48%-by-mass aqueous solution of sodium hydroxide was added to and mixed with the aqueous solution (3) for about 30 seconds in a state open to the atmosphere, whereby a monomer aqueous solution (3) was prepared. The temperature of the monomer aqueous solution (3) had been increased to about 80° C. owing to heat of neutralization and heat of dissolution generated in the course of the above mixing.

Then, at a time point at which the temperature of the above monomer aqueous solution (3) became 78° C., 17.6 parts by mass of a 4%-by-mass aqueous solution of sodium persulfate was added as a polymerization initiator, and the monomer aqueous solution (3) was stirred for about 5 seconds, whereby a reaction liquid (3) was made.

Next, the above reaction liquid (3) was poured, in a state open to the atmosphere, into a vat type container (bottom surface: 340×340 mm, height: 25 mm, inner surface: coated with Teflon (registered mark)) made of stainless steel. The vat type container had been heated such that the surface temperature thereof was 50° C. by using a hot plate (NEO HOTPLATE HI-1000 manufactured by AS ONE Corporation).

After the above reaction liquid (3) was poured into the above vat type container, a polymerization reaction was initiated 50 seconds later. The polymerization reaction progressed while, by the polymerization reaction, the reaction liquid (3) expanded and foamed toward the upper side in all directions while generating steam. Then, the resultant substance contracted to a size slightly larger than that of the bottom surface of the vat type container. The polymerization reaction (expansion and contraction) ended within about 1 minute. After the elapse of 3 minutes from the initiation of the polymerization reaction, a hydrous gel (3) was taken out.

Gel Pulverization Step

The same Gel pulverization was performed as Production Example 2 except that the multi-bore plate of Production Example 2 was changed to a multi-bore plate having a diameter of 100 mm, a bore diameter of 9.5 mm, 40 bores, an opening ratio of 36%, and a thickness of 10 mm. And a particulate hydrous gel (3) was obtained. The mass-average particle diameter of the obtained particulate hydrous gel (3) is indicated in Table 1.

Drying Step

Next, the above particulate hydrous gel (2) was placed, in a spread manner, on a wire mesh having a mesh opening size of 300 μm, and the wire mesh was put into the hot air drying machine. Then, hot air at 190° C. was caused to flow for 30 minutes so that the particulate hydrous gel (3) was dried, whereby a dried polymer (3) was obtained.

Classification Step

Subsequently, the dried polymer (3) was put in a roll mill (WML type roll pulverizer manufactured by Inokuchi Giken Ltd.), pulverized, and then classified by using two types of JIS standard sieves having mesh opening sizes of 850 μm and 150 μm, whereby a pre-surface-crosslinking water-absorbent resin (3) having an indefinite pulverized form was obtained. The various physical properties of the obtained pre-surface-crosslinking water-absorbent resin (3) are indicated in Table 2.

Surface-Crosslinking Step

Next, a surface-crosslinking agent solution formed from 0.4 parts by mass of ethylene glycol, 0.6 parts by mass of propylene glycol, and 2.5 parts by mass of deionized water was added to and evenly mixed with 100 parts by mass of the above pre-surface-crosslinking water-absorbent resin (3). Subsequently, the mixture was heated for 32 minutes at 205° C. and then crushed until the mixture passed through a JIS standard sieve having a mesh opening size of 850 μm, whereby a post-surface-crosslinking water-absorbent resin (3) was obtained. The various physical properties of the obtained post-surface-crosslinking water-absorbent resin (3) are indicated in Table 3.

The specific surface area of each of the pre-surface-crosslinking water-absorbent resin (3) and the post-surface-crosslinking water-absorbent resin (3) was 29 m²/kg.

Production Example 4

A water-absorbent resin (4) was produced under the following production conditions with reference to example 4 described in International Publication No. 2016/111223.

Monomer Aqueous Solution Preparation Step 421.7 parts by mass of acrylic acid, 140.4 parts by mass of a 48%-by-mass aqueous solution of sodium hydroxide, 2.4 parts by mass of polyethylene glycol diacrylate (n=9), 11.3 parts by mass of a 1.0%-by-mass aqueous solution of trisodium diethylenetriamine pentaacetate, 4.4 parts by mass of a 1.0%-by-mass aqueous solution of polyoxyethylene (20) sorbitan monostearate (manufactured by Kao Corporation), and 390.3 parts by mass of deionized water, were poured into a container having a volume of 2 L and made from polypropylene, and were mixed with one another, whereby an aqueous solution (4) was made. The deionized water had been heated to 40° C. in advance.

Polymerization Step

Subsequently, the above aqueous solution (4) was cooled while being stirred. At a time point at which the liquid temperature of the aqueous solution (4) became 39° C., 211.9 parts by mass of a 48%-by-mass aqueous solution of sodium hydroxide was added to and mixed with the aqueous solution (4) for about 20 seconds in a state open to the atmosphere, whereby a monomer aqueous solution (4) was prepared. The temperature of the monomer aqueous solution (4) had been increased to about 81° C. owing to heat of neutralization and heat of dissolution generated in the course of the above mixing.

Next, after nitrogen gas was introduced under the conditions of a pressure of 0.1 MPa and a flow rate of 0.1 L/min into the above monomer aqueous solution (4) in a stirred state using a Kinoshita glass ball filter (filter particle No. 4 manufactured by Kinoshita Rika Kogyo Corporation) for 10 seconds, 17.6 parts by mass of a 4.0 mass % aqueous sodium persulfate solution was added, and the mixture was further stirred for about 5 seconds, and then the mixture was poured, in a state open to the atmosphere, into a vat type container (bottom surface: 340×340 mm, height: 25 mm, inner surface: coated with Teflon (registered mark)) made of stainless steel. The time from the start of neutralization in the second stage to the pouring of the monomer aqueous solution (4) into the vat type container was 55 seconds. The vat type container had been heated such that the surface temperature thereof was 50° C. by using a hot plate (NEO HOTPLATE HI-1000 manufactured by AS ONE Corporation).

After the above the monomer aqueous solution (4) was poured into the above vat type container, a polymerization reaction was initiated 59 seconds later. The polymerization reaction progressed while, by the polymerization reaction, the monomer aqueous solution (4) expanded and foamed toward the upper side in all directions while generating steam. Then, the resultant substance contracted to a size slightly larger than that of the bottom surface of the vat type container. The polymerization reaction (expansion and contraction) ended within about 1 minute. After the elapse of 3 minutes from the initiation of the polymerization reaction, a hydrous gel (4) was taken out.

Gel Pulverization Step

The same Gel pulverization was performed as Production Example 2 except that the multi-bore plate of Production Example 2 was changed to a multi-bore plate having a diameter of 100 mm, a bore diameter of 6.4 mm, 83 bores, an opening ratio of 34%, and a thickness of 10 mm. And a particulate hydrous gel (4) was obtained. The mass-average particle diameter of the obtained particulate hydrous gel (4) is indicated in Table 1.

Drying Step

Next, the above particulate hydrous gel (4) was placed, in a spread manner, on a wire mesh having a mesh opening size of 300 μm, and the wire mesh was put into the hot air drying machine. Then, hot air at 190° C. was caused to flow for 30 minutes so that the particulate hydrous gel (4) was dried, whereby a dried polymer (4) was obtained.

Classification Step

Subsequently, the dried polymer (4) was put in a roll mill (WML type roll pulverizer manufactured by Inokuchi Giken Ltd.), pulverized, and then classified by using two types of JIS standard sieves having mesh opening sizes of 710 μm and 150 μm, whereby a pre-surface-crosslinking water-absorbent resin (4) having an indefinite pulverized form was obtained. The various physical properties of the obtained pre-surface-crosslinking water-absorbent resin (4) are indicated in Table 2.

Surface-Crosslinking Step

Next, a surface-crosslinking agent solution formed from 0.4 parts by mass of ethylene glycol, 0.6 parts by mass of propylene glycol, and 2.5 parts by mass of deionized water was added to and evenly mixed with 100 parts by mass of the above pre-surface-crosslinking water-absorbent resin (4). Subsequently, the mixture was heated for 40 minutes at 200° C. and then crushed until the mixture passed through a JIS standard sieve having a mesh opening size of 850 μm, whereby a post-surface-crosslinking water-absorbent resin (4) was obtained. The various physical properties of the obtained post-surface-crosslinking water-absorbent resin (4) are indicated in Table 3.

The specific surface area of each of the pre-surface-crosslinking water-absorbent resin (4) and the post-surface-crosslinking water-absorbent resin (4) was 36 m²/kg.

TABLE 1

|  |  | D50 [μm] |
|---|---|---|
| Production Example 1 | Particulate hydrous gel (1) | 3400 |
| Production Example 2 | Particulate hydrous gel (2) | 840 |
| Production Example 3 | Particulate hydrous gel (3) | 690 |
| Production Example 4 | Particulate hydrous gel (4) | 360 |

TABLE 2

|  |  | CRC [g/g] | Vortex [sec] | Specific surface area [m²/kg] |
|---|---|---|---|---|
| Production Example 1 | Pre-surface-crosslinking water-absorbent resin (1) | 46 | 47 | 22 |
| Production Example 2 | Pre-surface-crosslinking water-absorbent resin (2) | 35 | 30 | 29 |
| Production Example 3 | Pre-surface-crosslinking water-absorbent resin (3) | 37 | 37 | 29 |
| Production Example 4 | Pre-surface-crosslinking water-absorbent resin (4) | 31 | 21 | 36 |

TABLE 3

|  |  | CRC [g/g] | AAP [g/g] | D50 [μm] | Proportion of particles smaller than 150 μm [wt %] | Moisture content [wt %] | Vortex [sec] | Specific surface area [m²/kg] |
|---|---|---|---|---|---|---|---|---|
| Production Example 1 | Post-surface-crosslinking water-absorbent resin (1) | 36 | 23 | 400 | 2.0 | 1.5 | 55 | 22 |
| Production Example 2 | Post-surface-crosslinking water-absorbent resin (2) | 32 | 24 | 380 | 1.8 | 1.5 | 33 | 29 |
| Production Example 3 | Post-surface-crosslinking water-absorbent resin (3) | 30 | 26 | 400 | 2.1 | 1.5 | 42 | 29 |
| Production Example 4 | Post-surface-crosslinking water-absorbent resin (4) | 28 | 24 | 390 | 2.6 | 1.0 | 20 | 36 |

EXAMPLES

Example 1

50 g of the post-surface-crosslinking water-absorbent resin (2) obtained in production example 2 was heated to 50° C. and then put in a plastic container having a volume of 200 mL (inner diameter: 70 mm, depth: 140 mm). Subsequently, while the post-surface-crosslinking water-absorbent resin (2) in the plastic container was being stirred at a rotation rate of 450 rpm (stirring force coefficient: 3.206) by using a three-one motor mounted with an anchor type stirring blade (diameter: 57 mm, height: 70 mm) made with a metal rod having a diameter of 3 mm, an aqueous solution (1) having a liquid temperature of 25° C. and formed from 1.5 parts by mass of deionized water and 0.5 parts by mass of sodium bisulfite was added to 100 parts by mass of the above post-surface-crosslinking water-absorbent resin (2) by using a straight pipe (average droplet diameter: 2 mm) having an inner diameter of 1 mm. The obtained mixture was laminated in the form of a 5-cm layer, and the layer was left at rest for 1 hour to be cured in an aeration type hot air drying machine having an ambient temperature that was set to 60° C. The cured mixture was caused to pass through the wire mesh having a mesh opening size of 850 μm, whereby a water absorbent agent (1) was obtained. The various physical properties of the obtained water absorbent agent (1) are indicated in Table 5.

In Example 1, the stirring force coefficient is 3.206, and the value obtained from the right-hand side of expression (a) is 0.370 (=0.16×2+0.05). Thus, the relationship in expression (a) is satisfied.

Example 2

A water absorbent agent (2) was obtained by the same production condition as Example 1 except that the post-surface-crosslinking water-absorbent resin to be treated was changed to the post-surface-crosslinking water-absorbent resin (3) obtained in production example 3 and the straight pipe for supplying the aqueous solution (1) was changed to a straight pipe (average droplet diameter: 0.5 mm) having an inner diameter of 0.25 mm. The various physical properties of the obtained water absorbent agent (2) are indicated in Table 5.

In Example 2, 3.206 of the stirring force coefficient is employed as same as Example 1, and the value obtained from the right-hand side of expression (a) is 0.13 (=0.16× 0.5+0.05). Thus, the relationship in expression (a) is satisfied.

Example 3

A water absorbent agent (3) was obtained by the same production condition as Example 2 except that the supply of the aqueous solution (1) through the straight pipe was changed to a supply of the aqueous solution (1) by splaying through a hollow cone spray 1/4M-K010 (H.Ikeuchi & Co., Ltd.: Average droplet diameter 110 μm). The various physical properties of the obtained water absorbent agent (3) are indicated in Table 5.

In Example 3, 3.206 of the stirring force coefficient is employed as same as Example 2, and the value obtained from the right-hand side of expression (a) is 0.0676 (=0.16× 0.11+0.05). Thus, the relationship in expression (a) is satisfied.

Example 4

A water absorbent agent (4) was obtained by the same production condition as Example 3 except that a rotation rate at stirring in Example 1 was changed to 100 rpm (stirring force coefficient: 0.158) and the supply of the aqueous solution (1) through the straight pipe in Example 1 was changed to a supply of the aqueous solution (1) by splaying through a hollow cone spray 1/4M-K010 (H.Ikeuchi & Co., Ltd.: Average droplet diameter 110 μm). The various physical properties of the obtained water absorbent agent (4) are indicated in Table 5.

In Example 4, the stirring force coefficient is 0.158, and the value obtained from the right-hand side of expression (a) is 0.0676 (=0.16×0.11+0.05). Thus, the relationship in expression (a) is satisfied.

Example 5

A water absorbent agent (5) was obtained by the same production condition as Example 3 except that the post-surface-crosslinking water-absorbent resin to be treated was changed to the post-surface-crosslinking water-absorbent resin (4) obtained in production example 4. The various physical properties of the obtained water absorbent agent (5) are indicated in Table 5.

Example 6

A water absorbent agent (6) was obtained by the same production condition as Example 5 except that the aqueous solution to be supplied was changed to an aqueous solution (2) having a liquid temperature of 25° C. and formed from 2.0 parts by mass of deionized water and 0.5 parts by mass of sodium bisulfite. The various physical properties of the obtained water absorbent agent (6) are indicated in Table 5.

Example 7

A water absorbent agent (7) was obtained by the same production condition as Example 3 except that a heated temperature of the post-surface-crosslinking water-absorbent resin (3) was changed from 50° C. to 120° C. The various physical properties of the obtained water absorbent agent (7) are indicated in Table 5.

Example 8

A water absorbent agent (8) was obtained by the same production condition as Example 1 except that a rotation rate at stirring was changed to 200 rpm (stirring force coefficient: 0.633). The various physical properties of the obtained water absorbent agent (8) are indicated in Table 5.

In Example 8, the stirring force coefficient is 8, 0.633, and the value obtained from the right-hand side of expression (a) is 0.370 (=0.16×2+0.05). Thus, the relationship in expression (a) is satisfied.

Example 9

50 g of the pre-surface-crosslinking water-absorbent resin (4) obtained in production example 4 was heated to 50° C. and then put in a plastic container having a volume of 200 mL (inner diameter: 70 mm, depth: 140 mm). Subsequently, while the pre-surface-crosslinking water-absorbent resin (4) in the plastic container was being stirred at a rotation rate of 450 rpm (stirring force coefficient: 3.206) by using a three-one motor mounted with an anchor type stirring blade (diameter: 57 mm, height: 70 mm) made with a metal rod having a diameter of 3 mm, an aqueous solution (1) having a liquid temperature of 25° C. and formed from 0.1 parts by mass of ethylene glycol diglycidyl ether, 1.5 parts by mass of propylene glycol, 3.5 parts by mass of deionized water and 0.5 parts by mass of sodium bisulfite was added to 100 parts by mass of the above pre-surface-crosslinking water-absorbent resin (4) by using a hollow cone spray 1/4M-K010 (H.Ikeuchi & Co., Ltd.: Average droplet diameter 110 μm). The obtained mixture was laminated in the form of a 5-cm layer, and the layer was left at rest for 40 minutes to be heat treated in an aeration type hot air drying machine having an ambient temperature that was set to 100° C. The heat treated mixture was caused to pass through the wire mesh having a mesh opening size of 850 μm, whereby a water absorbent agent (9) was obtained. The various physical properties of the obtained water absorbent agent (9) are indicated in Table 5.

In Example 9, the stirring force coefficient is 3.206, and the value obtained from the right-hand side of expression (a) is 0.0676 (=0.16×0.11+0.05). Thus, the relationship in expression (a) is satisfied.

Comparative Example 1

A following experiment was conducted under the following conditions with reference to the conditions of Example 6 of International Publication No. 2006/088115 (Patent Literature 1).

A comparative water absorbent agent (1) was obtained by the same production condition as Example 1 except that the post-surface-crosslinking water-absorbent resin to be treated was changed to the post-surface-crosslinking water-absorbent resin (1) obtained in production example 1. The various physical properties of the obtained comparative water absorbent agent (1) are indicated in Table 5.

Comparative Example 2

A comparative water absorbent agent (2) was obtained by the same production condition as Example 1 except that the post-surface-crosslinking water-absorbent resin to be treated was changed to the post-surface-crosslinking water-absorbent resin (1) obtained in production example 1 and a rotation rate at stirring was changed to 100 rpm (stirring force coefficient: 0.158). The various physical properties of the obtained comparative water absorbent agent (2) are indicated in Table 5.

In Comparative Example 2, the stirring force coefficient is 0.158, and the value obtained from the right-hand side of expression (a) is 0.370 (=0.16×2+0.05). Thus, the relationship in expression (a) is unsatisfied.

Comparative Example 3

A following experiment was conducted under the following conditions with reference to the conditions of Example 3 of International Publication No. 2006/088115 (Patent Literature 1).

A comparative water absorbent agent (3) was obtained by the same production condition as Example 3 except that the post-surface-crosslinking water-absorbent resin to be treated was changed to the post-surface-crosslinking water-absorbent resin (1) obtained in production example 1. The various physical properties of the obtained comparative water absorbent agent (3) are indicated in Table 5.

Comparative Example 4

A comparative water absorbent agent (4) was obtained by the same production condition as Example 4 except that the post-surface-crosslinking water-absorbent resin to be treated was changed to the post-surface-crosslinking water-absorbent resin (1) obtained in production example 1. The various physical properties of the obtained comparative water absorbent agent (4) are indicated in Table 5.

Comparative Example 5

A comparative water absorbent agent (5) was obtained by the same production condition as Example 1 except that the post-surface-crosslinking water-absorbent resin to be treated was changed to the post-surface-crosslinking water-absorbent resin (1) obtained in production example 1 and a heated temperature of the above water-absorbent resin (1) was changed from 50° C. to 160° C. The various physical properties of the obtained comparative water absorbent agent (5) are indicated in Table 5.

Comparative Example 6

A comparative water absorbent agent (6) was obtained by the same production condition as Example 4 except that the post-surface-crosslinking water-absorbent resin to be treated was changed to the post-surface-crosslinking water-absorbent resin (1) obtained in production example 1 and a heated temperature of the above water-absorbent resin (1) was changed from 50° C. to 160° C. The various physical properties of the obtained comparative water absorbent agent (6) are indicated in Table 5.

Comparative Example 7

A comparative water absorbent agent (7) was obtained by the same production condition as Example 1 except that the post-surface-crosslinking water-absorbent resin to be treated was changed to the post-surface-crosslinking water-absorbent resin (1) obtained in production example 1, the aqueous solution to be supplied was changed to an aqueous solution (3) formed from 2.1 parts by mass of deionized water and 0.7 parts by mass of sodium bisulfite, and the straight pipe for supplying the aqueous solution (3) was changed to a straight pipe (average droplet diameter: 4 mm) having an inner diameter of 2 mm. The various physical properties of the obtained comparative water absorbent agent (7) are indicated in Table 5.

In Comparative Example 7, the stirring force coefficient is 3.206, and the value obtained from the right-hand side of expression (a) is 0.690 (=0.16×4+0.05). The average droplet diameter exceeds 2.5 mm.

Comparative Example 8

A comparative water absorbent agent (8) was obtained by the same production condition as Example 1 except that a rotation rate at stirring was changed to 100 rpm (stirring force coefficient: 0.158) and the straight pipe for supplying the aqueous solution (1) was changed to a straight pipe (average droplet diameter: 4 mm) having an inner diameter of 2 mm. The various physical properties of the obtained comparative water absorbent agent (8) are indicated in Table 5.

In Comparative Example 8, the stirring force coefficient is 0.158, and the value obtained from the right-hand side of expression (a) is 0.690 (=0.16×4+0.05). Thus, the relationship in expression (a) is unsatisfied. The average droplet diameter exceeds 2.5 mm.

Comparative Example 9

A comparative water absorbent agent (9) was obtained by the same production condition as Example 1 except that a heated temperature of the above post-surface-crosslinking water-absorbent resin (2) was changed to 160° C. and the straight pipe for supplying the aqueous solution (1) was changed to a straight pipe (average droplet diameter: 4 mm) having an inner diameter of 2 mm. The various physical properties of the obtained comparative water absorbent agent (9) are indicated in Table 5.

In Comparative Example 9, the stirring force coefficient is 3.206, and the value obtained from the right-hand side of expression (a) is 0.690 (=0.16×4+0.05). The average droplet diameter exceeds 2.5 mm.

Comparative Example 10

A comparative water absorbent agent (10) was obtained by the same production condition as Example 1 except that the aqueous solution to be supplied was changed to an aqueous solution (4) formed from 1.8 parts by mass of deionized water and 0.6 parts by mass of sodium bisulfite and the straight pipe for supplying the aqueous solution (4) was changed to a straight pipe (average droplet diameter: 3 mm) having an inner diameter of 1.5 mm. The various physical properties of the obtained comparative water absorbent agent (10) are indicated in Table 5.

In Comparative Example 10, the stirring force coefficient is 3.206, and the value obtained from the right-hand side of expression (a) is 0.530 (=0.16×3+0.05). The average droplet diameter exceeds 2.5 mm.

Comparative Example 11

A comparative water absorbent agent (11) was obtained by the same production condition as Example 1 except that a rotation rate at stirring was changed to 150 rpm (stirring force coefficient: 0.356). The various physical properties of the obtained comparative water absorbent agent (11) are indicated in Table 5.

In Comparative Example 11, the stirring force coefficient is 0.356 and the value obtained from the right-hand side of expression (a) is 0.370 (=0.16×2+0.05). Thus, the relationship in expression (a) is unsatisfied.

Comparative Example 12

The heated temperature (curing temperature) of the sulfite aqueous solution added solution in Example 1 was changed from 60° C. to room temperature in this example, and thus obtained mixture was insufficiently cured and the surface of the mixture was still in the moisture state. Thus the mixture could not pass through the wire mesh having a mesh opening size of 850 μm, whereby a desired water absorbent agent could not obtained.

Comparative Example 13

The heated temperature (curing temperature) and curing time period of the sulfite aqueous solution added solution in Example 1 was changed from 60° C., 1 hour to 35° C., 1 minute in this example, and thus obtained mixture was insufficiently cured and the surface of the mixture was still in the moisture state. Thus the mixture could not pass through the wire mesh having a mesh opening size of 850 μm, whereby a desired water absorbent agent could not obtained.

Comparative Example 14

50 g of the pre-surface-crosslinking water-absorbent resin (2) obtained in production example 2 was heated to 50° C. and then put in a plastic container having a volume of 200 mL (inner diameter: 70 mm, depth: 140 mm). Subsequently, while the pre-surface-crosslinking water-absorbent resin (2) in the plastic container was being stirred at a rotation rate of 450 rpm (stirring force coefficient: 3.206) by using a three-one motor mounted with an anchor type stirring blade (diameter: 57 mm, height: 70 mm) made with a metal rod having a diameter of 3 mm, an aqueous solution (1) having a liquid temperature of 25° C. and formed from 1.5 parts by mass of deionized water and 0.5 parts by mass of sodium bisulfite in addition to a surface-crosslinking agent solution formed from 0.4 parts by mass of ethylene carbonate, 0.6 parts by mass of propylene glycol, and 2.6 parts by mass of deionized water was added to 100 parts by mass of the above pre-surface-crosslinking water-absorbent resin (2) by using a straight pipe (average droplet diameter: 2 mm) having an inner diameter of 1 mm. The obtained mixture was heated at 200° C. for 30 minutes and then passed through the wire mesh having a mesh opening size of 850 μm, thus obtained water absorbent agent emitted malodors caused by sulfur oxide. Therefore, the water absorbent agent was evaluated as unsuitable for the use as hygienic materials and no further evaluation was conducted.

Comparative Example 15

The temperature of the above aqueous solution (1) in Example 3 was changed from 25° C. to 90° C. in this example. A supply of the aqueous solution by splaying through the hollow cone spray produced deposition at the tip of the spray nozzle and increased the possibility of clogging the nozzle with growing deposition. Therefore, the experiment was discontinued.

Measurement methods for the physical properties in the tables are as follows. If, for example, the measurement target is not a water absorbent agent, the measurement methods apply while the "water absorbent agent" in the following description is replaced with the "particulate hydrous gel", the "pre-surface-crosslinking water-absorbent resin", or the "post-surface-crosslinking water-absorbent resin".

[Mass-Average Particle Diameter D50]

The mass-average particle diameter D50 of each water absorbent agent according to the present invention was measured according to a measurement method described in U.S. Pat. No. 7,638,570.

Meanwhile, the mass-average particle diameter D50 of each crosslinked polymer in the form of a particulate hydrous gel was measured according to the following method.

That is, 500 g of a 20%-by-mass aqueous solution of sodium chloride (hereinafter, referred to as an "EMAL aqueous solution") containing 0.08% by mass of a surfactant (EMAL 20C manufactured by Kao Corporation) was poured into a cylindrical container (8 cm (diameter)×21 cm (height)) made from polypropylene and having a volume of 1 L. 20 g of the particulate hydrous gel (temperature: not lower than 20° C. and not higher than 25° C.) having a solid content of $\alpha$ % by mass was added to the EMAL aqueous solution.

Subsequently, the above EMAL aqueous solution was stirred for 60 minutes at 300 rpm by using a stirrer tip (7 mm (diameter)×50 mm (length)), whereby a dispersion liquid was obtained.

After the end of the above stirring, JIS standard sieves (specifically, sieves having diameters of 21 cm and mesh opening sizes of 8 mm/4 mm/2 mm/1 mm/0.60 mm/0.30 mm/0.15 mm/0.075 mm) disposed on a rotary table were used, and the above dispersion liquid was poured onto a center portion of the sieves. Further, 100 g of the EMAL aqueous solution was used to wash, onto the sieves, the entire particulate hydrous gel remaining in the above cylindrical container.

Then, while the above sieves were rotated by hand (specifically, rotated at 20 rpm), 6000 g of the EMAL aqueous solution was uniformly poured from a height of 30 cm by using a shower nozzle (the number of holes: 72, liquid rate: 6.0 L/min), such that the pouring range (50 cm$^2$) covered the entire sieves. Thus, the particulate hydrous gel was classified.

After the above operation, the particulate hydrous gel remaining on each sieve was drained for about 2 minutes and weighed. Then, from the mass of the particulate hydrous gel remaining on each sieve, the percentage by mass of the particulate hydrous gel was calculated on the basis of the following expressions (1) and (2).

$$X = (w/W) \times 100. \qquad \text{expression (1)}$$

$$R(a) = (20/W)^{(1/3)} \times r \qquad \text{expression (2)}$$

Here,

X: the percentage by mass (unit: % by mass) of the particulate hydrous gel remaining on each sieve after the classification and the drainage, w: the mass (unit: g) of the particulate hydrous gel remaining on each sieve after the classification and the drainage, W: the total mass (unit: g) of the particulate hydrous gels remaining on the respective sieves after the classification and the drainage, R(a): the mesh opening size (unit: mm) of a sieve in terms of a particulate hydrous gel having a solid content of α % by mass, and r: the mesh opening size (unit: mm) of a sieve with which the particulate hydrous gel swollen in the 20%-by-mass aqueous solution of sodium chloride was classified.

[Absorption Capacity Under No Load (CRC)]

The CRC of each water absorbent agent according to the present invention was measured according to the EDANA method (WSP241.3(10)). Specifically, 0.2 g of the water absorbent agent was put into a bag made of a nonwoven fabric, then the bag was immersed in a large excess of a 0.9%-by-mass aqueous solution of sodium chloride for 30 minutes so as to cause the water absorbent agent to freely swell, then the water absorbent agent was dehydrated by using a centrifugal separator (250 G), and then an absorption capacity under no load (CRC) (unit: g/g) was measured.

[Vortex-Method-Based Water Absorption Time]

The Vortex-method-based water absorption time of each water absorbent agent according to the present invention was measured in the following procedure according to JIS K 7224 (1996).

First, 0.02 parts by mass of Food Blue No. 1 (CAS No. 3844-45-9) as a food additive was added to 1000 parts by mass of a physiological saline solution to color the physiological saline solution, and the liquid temperature thereof was adjusted to 30° C. The solution was used as a test solution.

Next, 50 mL of the above test solution was measured out into a beaker having a volume of 100 mL, a cylindrical stirring bar having a length of 40 mm and a diameter of 8 mm was put in the beaker, and the test solution started to be stirred at 600 rpm. Subsequently, 2.0 g of the water-absorbent resin was put into the test solution during the above stirring, and the time taken until the stirring bar (stirrer tip) was covered with the test solution was measured. The time was used as a Vortex-method-based water absorption time.

[Absorption Capacity Under Load (AAP)]

The AAP of each water absorbent agent according to the present invention was measured according to the EDANA method (WSP242.3 (10)). Specifically, 0.9 g of the water absorbent agent was swollen in a large excess of a 0.9%-by-mass aqueous solution of sodium chloride for 1 hour under a load of 2.06 kPa (21 g/cm², 0.3 psi), and then an absorption capacity under load (AAP) (unit: g/g) was measured. In the present specification, the measurement was performed with the load condition being changed to 4.83 kPa (49 g/cm², 0.7 psi). Although the absorption capacities are each written as "AAP" in the present specification, all the absorption capacities were measured under a load of 4.83 kPa.

[Moisture Content]

The moisture content of each water absorbent agent according to the present invention was measured according to the EDANA method (WSP230.3 (10)). In the present invention, out of the measurement conditions defined in WSP230.3 (10), the amount of the water absorbent agent as a sample was changed to 1.0 g and the drying temperature was changed to 180° C., for the measurement. A value calculated by "100−moisture content (% by mass)" was used as the solid content (unit: % by mass) of the water absorbent agent.

[Specific Surface Area]

The specific surface area of each water absorbent agent according to the present invention is a value obtained by analyzing, with high-speed three-dimensional analyzing software (TRI/3D-VOL-FCS64 manufactured by Ratoc System Engineering Co., Ltd.), three-dimensional image data of the water absorbent agent acquired by using a micro-focus X-ray CT system (inspeXio SMX-100CT manufactured by Shimadzu Corporation).

Specifically, first, 1 g of the water absorbent agent was put into a lidded columnar container made of plastic and having an inner diameter of about 1 cm and a height of about 5 cm, and the columnar container was sufficiently shaken such that there was no unevenness in particle size. Subsequently, a double-coated adhesive tape was pasted on the bottom surface of the above columnar container, and the columnar container was fixed on a sample mount of the above micro-focus X-ray CT system. Then, three-dimensional image data was acquired under the conditions in the following Table 4.

TABLE 4

| |
| --- |
| X-ray tube voltage (kV): 50 |
| X-ray tube current (μA): 40 |
| Size in inch (inch): 4.0 |
| X-ray filter: not available |
| SDD (mm): 500 |
| SRD (mm): 40 |
| Z (mm): 108 |
| X (mm): 0 |
| Y (mm): 0 |
| CT mode 1: CBCT |
| CT mode 2: normal scan |
| Scan angle: full scan |
| Number of views: 1200 |
| Average number: 5 |
| Number of times of multi-rotation: not available |
| Smoothing: YZ |
| Slice thickness (mm): 0.008 |
| Inter-slice distance (mm): 0.010 |
| Scaling coefficient: 50 |
| BHC data: not available |
| Accurate mode: available |
| FOVXY (mm): 5.0 |
| FOVZ (mm): 4.0 |
| Size in voxel (mm/voxel): 0.010 |

Subsequently, analysis was performed according to the following procedure by using the above high-speed three-dimensional analyzing software.

1. From the menu field, Particle Measurement>3D Particle>Particle Separation>Large Particle Separation was selected.
2. L-W was selected in the Binarize tab on the EVC panel, the value of L was changed from an initial value thereof to a value larger than the initial value by 1 with the value of W being kept as an initial value thereof, and a circular measurement target region was extracted. Subsequently, this process was applied to all slice images. Image data extracted by this operation is defined as (A).

3. L-W was selected in the Binarize tab on the EVC panel, the value of L was changed from the initial value to 37580 with the value of W being kept as the initial value, and all the particles in the measurement target region were extracted. Subsequently, this process was applied to all the slice images. Particle image data extracted by this operation is defined as (B).
4. First, in the Binary tab on the EVC panel, Ers Sml was selected, and particles having particle sizes not larger than 10 voxels and considered as noises were erased on the basis of the particle image data (B). Subsequently, Invert was selected in the Binary tab on the EVC panel, to cause inversion between the region in which particles were extracted and the region in which no particles were extracted. Subsequently, Ers Sml was selected, and particles having particle sizes not larger than 10 voxels and considered as noises were erased. Subsequently, in the 3D tab on the EVC panel, Labeling was selected, and further, Volume and Max were selected so that only a region with the largest volume was extracted. Lastly, Invert was selected again in the Binary tab on the EVC panel so that, in the measurement target region, noises were erased and all the particles were extracted in a void-filled state. Particle image data extracted by these operations is defined as (C). The void mentioned herein refers to a cavity that is present inside the water-absorbent resin and that is not in contact with the outside.
5. In the L Op tab (inter-channel logical computation process), the particle image data (B) was subtracted from the particle image data (C). Then, in the Binary tab on the EVC panel, Ers Sml was selected, and particles having particle sizes not larger than 10 voxels and considered as noises were erased so that voids were extracted.
6. On the basis of the particle image data (C), Small Particle Extraction was selected on a large particle separation panel (Large Particle Extraction was not selected), each of Constriction Proportion, Repair Filter Size, and Repair Mrg Sml Diameter was set to 0, and separation and color sorting for particles were performed.
7. In the 3D tab on the EVC panel, Labeling was selected, and further, Coordinate Value (Cycle) was selected and Fine Particle Size was set to 10, to perform a separation operation for particles.
8. From the menu field, Particle Measurement>Voids among 3D Particles>Post-Separation Measurement was selected. Subsequently, a calculation process was performed on the Post-Separation Measurement panel while the unit was set to voxel, edge particles were set to be erased, Surface Area Calculation and Void Calculation were selected as measurement items, and the image data (A) extracted by the operation in the above item 2 was selected as a measurement ROI to be specified. By the above operations, the total surface area of all the particles (unit: $mm^2$), the nominal total volume of all the particles (unit: $mm^3$), and the total volume of the voids (unit: $mm^3$) in the measurement target region, were calculated. The nominal total volume refers to the total volume of all particles calculated by assuming that no voids are present among the particles. While the values obtained through the above image analysis were used and the true density of the water absorbent agent was set to 1.7 $g/cm^3$, the specific surface area of the water absorbent agent was calculated from the following expression.

Specific surface area ($m^2$/kg)=total surface area of all particles ($mm^2$)/((nominal total volume of all particles ($mm^3$)−total volume of voids ($mm^3$))× 1.7 (g/$cm^3$)

[Froude Number]

The Froude number is a value calculated from the following expression (4) and is a dimensionless number indicating the ratio between gravity and inertial force of a fluid.

$$Fr=n^2 \times d/g \text{ (where } n=N/60)\qquad\text{expression (4)}$$

Here,
Fr: Froude number,
n: rotation speed (unit: $s^{-1}$),
d: stirring blade diameter (unit: m),
g: gravitational acceleration (unit: $m/s^2$), and
N: rotation rate (unit: rpm).

[Stirring Force Coefficient]

From the above expression (4), it is considered that $n^2 \times d$ (=Fr×g) is a number related to the inertial force of a fluid. That is, in the present invention, $n^2 \times d$ (=Fr×g) is regarded as a stirring force coefficient in stirring of each water absorbent agent that is stirred. The stirring force coefficient in the present invention is a value obtained when the water absorbent agent having been put in a plastic container having a volume of 200 mL (inner diameter: 70 mm, depth: 140 mm) was stirred at a predetermined rotation rate by using an anchor type stirring blade (diameter: 57 mm, height: 70 mm) made with a metal rod having a diameter of 3 mm. Although a one-stage stirring blade is used in the present application, a multiple-stage blade may be used as a means for improving the stirring force coefficient and improving even mixability between the water absorbent agent and the sulfur-containing reducing agent aqueous solution. It is noted that, in the case of using a multiple-stage blade, a value obtained by multiplying the average stirring force coefficient per stage by the number of stages is regarded as the stirring blade coefficient of the multiple-stage blade. Meanwhile, in the case of using a helical stirring blade such as a screw or a ribbon blade of which the number of turns is one or more, a value obtained by multiplying the average stirring force coefficient per turn by the number of turns is regarded as the stirring force coefficient of the helical stirring blade.

[Amount of Aggregated Coarse Particles in Product (Referred to as "Product Lump Amount")]

Coarse particles to be removed from each cured mixture according to the present invention are obtained, as the amount of aggregated coarse particles in a product, from the following expression (5).

$$\text{(Amount of aggregated coarse particles in product)}=a/b \times 100\qquad\text{expression (5)}$$

Here,
a: the mass (unit: g) of a portion, of the cured mixture, that remains on a wire mesh having a mesh opening size of 850 μm when the mixture is placed on the wire mesh and squashed with a spatula, and
b: the total mass (unit: g) of the cured mixture.

[Sulfur-Containing Reducing Agent Dispersity]

The sulfur-containing reducing agent dispersity of each water absorbent agent according to the present invention is obtained from the following expression (6).

$$\text{(Sulfur-containing reducing agent dispersity)}=\sigma 1/\text{(sulfur-containing reducing agent content of water absorbent agent)} \times 100.\qquad\text{expression (6)}$$

Here,

σ1: a standard deviation among the following A1, A2, and A3,

A1: the sulfur-containing reducing agent content (unit: % by mass) of particles that are not smaller than 500 μm out of the particles forming the water absorbent agent, A2: the sulfur-containing reducing agent content (unit: % by mass) of particles that are smaller than 500 μm and not smaller than 300 μm out of the particles forming the water absorbent agent, and A3: the sulfur-containing reducing agent content (unit: % by mass) of particles that are smaller than 300 μm out of the particles forming the water absorbent agent.

In the table, "on 500 μm" means particles not smaller than 500 μm, "500-300 μm" means particles smaller than 500 μm and not smaller than 300 μm, and "pass 300 μm" means particles smaller than 300 μm.

[Residual Monomer]

Regarding a residual monomer in each water absorbent agent according to the present invention, 1.0 g of the water absorbent agent was added to 200 ml of a 0.9%-by-mass aqueous solution of sodium chloride, and the solution was stirred for 1 hour and extracted. Then, the monomer content (unit: ppm (on a mass basis)) of the extracted solution was measured by high-performance liquid chromatography.

[Residual Monomer Variation Rate]

The residual monomer variation rate of each water absorbent agent according to the present invention is obtained from the following expression (7).

(Residual monomer variation rate)=σ2/(residual monomer content of water absorbent agent)×100  expression (7)

Here, particle sizes are defined in sieve classification,

σ2: a standard deviation among the following B1, B2, and B3,

B1: the residual monomer content (unit: ppm) of particles that are not smaller than 500 μm out of the particles forming the water absorbent agent, B2: the residual monomer content (unit: ppm) of particles that are smaller than 500 μm and not smaller than 300 μm out of the particles forming the water absorbent agent, and B3: the residual monomer content (unit: ppm) of particles that are smaller than 300 μm out of the particles forming the water absorbent agent.

[Sulfur-Containing Reducing Agent Content]

Each sulfur-containing reducing agent content according to the present invention was measured according to either of the following methods.

In the case where the sulfur-containing reducing agent was sodium bisulfite:

First, 0.5 g of the water absorbent agent was added to 500 ml of pure water, and stirring was performed for 1 hour at 600 rpm. Then, the solution was filtered to collect 10 g of a filtrate. 10 g of an aqueous solution obtained by diluting 0.025 g of malachite green oxalate with 600 g of pure water was added to 10 g of the obtained filtrate, and stirring was performed for 30 minutes at 600 rpm. Then, the obtained liquid was measured for the absorbance thereof in a wavelength of 618 nm by using a spectrophotometer, whereby a sulfur-containing reducing agent content was calculated.

In the case where the sulfur-containing reducing agent was sodium sulfite:

A method can be employed in which a sulfite is reacted with iodine, then an excessive amount of iodine is subjected to back titration with sodium thiosulfate, and the sulfite is quantified on the basis of an iodine amount required for the reaction.

TABLE 5

| | | Product lump amount [% by mass] | Sulfur-containing reducing agent dispersity | Sulfur-containing reducing agent addition amount [% by mass] | | | | Residual monomer variation rate [%] | Residual monomer [ppm] | | | | Specific surface area [m²/kg] |
|---|---|---|---|---|---|---|---|---|---|---|---|---|---|
| | | | | as is | on 500 μm | 500-300 μm | pass 300 μm | | as is | on 500 μm | 500-300 μm | pass 300 μm | |
| Example 1 | Water absorbent agent (1) | 1.3 | 23.9 | 0.45 | 0.39 | 0.44 | 0.59 | 13.3 | 306 | 275 | 298 | 354 | 29 |
| Example 2 | Water absorbent agent (2) | <1 | 22.5 | 0.49 | 0.40 | 0.42 | 0.60 | 18.9 | 378 | 306 | 348 | 445 | 29 |
| Example 3 | Water absorbent agent (3) | <1 | 24.0 | 0.48 | 0.38 | 0.42 | 0.60 | 14.6 | 366 | 306 | 355 | 413 | 29 |
| Example 4 | Water absorbent agent (4) | <1 | 25.6 | 0.46 | 0.39 | 0.46 | 0.62 | 16.8 | 323 | 278 | 312 | 384 | 29 |
| Example 5 | Water absorbent agent (5) | <1 | 21.9 | 0.46 | 0.39 | 0.46 | 0.59 | 16.0 | 390 | 315 | 357 | 438 | 36 |
| Example 6 | Water absorbent agent (6) | <1 | 14.8 | 0.49 | 0.45 | 0.45 | 0.58 | 14.0 | 321 | 278 | 303 | 365 | 36 |
| Example 7 | Water absorbent agent (7) | <1 | 25.5 | 0.46 | 0.38 | 0.42 | 0.60 | 19.1 | 371 | 299 | 355 | 440 | 29 |
| Example 8 | Water absorbent agent (8) | 1.5 | 27.5 | 0.51 | 0.38 | 0.52 | 0.66 | 19.8 | 375 | 299 | 345 | 444 | 29 |
| Example 9 | Water absorbent agent(9) | 1.5 | 18.9 | 0.48 | 0.42 | 0.45 | 0.59 | 19.6 | 470 | 365 | 437 | 548 | 36 |

TABLE 5-continued

| | | Product lump amount [% by mass] | Sulfur-containing reducing agent dispersity | Sulfur-containing reducing agent addition amount [% by mass] | | | | Residual monomer variation rate [%] | Residual monomer [ppm] | | | | Specific surface area [m²/kg] |
|---|---|---|---|---|---|---|---|---|---|---|---|---|---|
| | | | | as is | on 500 μm | 500-300 μm | pass 300 μm | | as is | on 500 μm | 500-300 μm | pass 300 μm | |
| Comparative Example 1 | Comparative water absorbent agent (1) | <1 | 20.9 | 0.47 | 0.41 | 0.41 | 0.58 | 14.6 | 312 | 272 | 300 | 361 | 22 |
| Comparative Example 2 | Comparative water absorbent agent (2) | <1 | 23.7 | 0.44 | 0.39 | 0.44 | 0.59 | 14.5 | 356 | 285 | 346 | 388 | 22 |
| Comparative Example 3 | Comparative water absorbent agent (3) | <1 | 23.8 | 0.45 | 0.40 | 0.41 | 0.59 | 17.4 | 348 | 310 | 317 | 418 | 22 |
| Comparative Example 4 | Comparative water absorbent agent (4) | <1 | 22.5 | 0.49 | 0.41 | 0.43 | 0.61 | 19.0 | 307 | 279 | 328 | 395 | 22 |
| Comparative Example 5 | Comparative water absorbent agent (5) | <1 | 25.8 | 0.46 | 0.39 | 0.40 | 0.60 | 15.3 | 354 | 300 | 319 | 402 | 22 |
| Comparative Example 6 | Comparative water absorbent agent (6) | <1 | 22.3 | 0.46 | 0.38 | 0.44 | 0.58 | 14.3 | 363 | 305 | 344 | 408 | 22 |
| Comparative Example 7 | Comparative water absorbent agent (7) | 1.5 | 27.7 | 0.65 | 0.48 | 0.64 | 0.84 | 19.5 | 290 | 255 | 288 | 365 | 22 |
| Comparative Example 8 | Comparative water absorbent agent (8) | 2.2 | n/a | N.D. | 0.30 | N.D. | N.D. | 21.0 | 406 | 351 | 370 | 507 | 29 |
| Comparative Example 9 | Comparative water absorbent agent (9) | 3.4 | n/a | N.D. | N.D. | N.D. | N.D. | 23.2 | 391 | 305 | 344 | 478 | 29 |
| Comparative Example 10 | Comparative water absorbent agent (10) | 1.8 | 29.1 | 0.60 | 0.45 | 0.55 | 0.79 | 20.7 | 301 | 271 | 368 | 387 | 29 |
| Comparative Example 11 | Comparative water absorbent agent (11) | 1.8 | 35.0 | 0.50 | 0.40 | 0.58 | 0.75 | 22.5 | 377 | 332 | 384 | 498 | 29 |

(Supplement)

Although not indicated in Table 5, the CRC, the AAP, and the Vortex of each of the water absorbent agents obtained in Examples 1 to 9 and Comparative Examples 1 to 11 take approximately the same values as the CRC, the AAP, and the Vortex (Table 3) of the corresponding one of the water-absorbent resins (1) to (4) to which the sulfur-containing reducing agent aqueous solution has not yet been added. The water absorbent agent in each of Examples 1 to 8 has an AAP taking a high value not lower than 24 g/g and not higher than 26 g/g, has a Vortex-method-based water absorption time also taking a favorable value not longer than 45 seconds, and has a mass-average particle diameter D50 not smaller than 380 μm and smaller than 430 μm.

From the results in Table 5, it is found that satisfaction of the following conditions (1) to (4) at the time of adding an aqueous solution formed from deionized water and a sulfur-containing reducing agent to a water-absorbent resin is important in order to obtain a water absorbent agent having a short water absorption time and prone to less variation in a residual monomer.

(1) The specific surface area of the water-absorbent resin is not lower than 25 m²/kg.
(2) The average droplet diameter of the sulfur-containing reducing agent aqueous solution is not larger than 2.5 mm, and the temperature of the aqueous solution is not higher than 80° C.
(3) Stirring-mixing is performed so as to satisfy the following expression (a) in a mixing step, $$\text{stirring force coefficient} \geq 0.16 \times (\text{average droplet diameter (mm)}) + 0.05 \quad \text{(a)}$$

where the stirring force coefficient is defined by (Froude number Fr)×(gravitational acceleration g).
(4) A heating and drying step is performed at not lower than 40° C. and not higher than 150° C. after the mixing step.

Further, it was found that the stirring force coefficient needed to be appropriately adjusted (Examples 1 to 8).

As a result, it has been found that even addition of the above aqueous solution makes it possible to, even with a water-absorbent resin having an increased specific surface area, reduce a residual monomer variation rate indicating variation in a residual monomer content among particle sizes to a small value, and further, reduce a sulfur-containing reducing agent dispersity indicating variation in the sulfur-containing reducing agent among particles to a value not larger than 28 and further not larger than 24. The water absorbent agent obtained in each of Examples 1 to 9 is found to be a novel water absorbent agent having a high specific surface area and having a sulfur-containing reducing agent dispersity and a residual monomer variation rate which are reduced to small values.

Comparative Examples 1 to 7 are examples in each of which the specific surface area of the water-absorbent resin having been used is low. Although the specific surface area of the water-absorbent resin was as low as 22 $m^2$/kg and the droplet diameter, the stirring force coefficient, and/or the temperature of the water-absorbent resin was outside the range in the claims of the present application, the residual monomer variation rate indicating the variation in the residual monomer among particle sizes was successfully reduced to a small value. However, since the specific surface area of the obtained water absorbent agent was low, a sufficient water absorption time (Vortex) was not obtained for the water absorbent agent.

Specifically,

Comparative Examples 1 and 4 are examples obtained by changing only the specific surface areas of the water-absorbent resins in Examples 1 and 4 to 22 $m^2$/kg, Comparative Example 2 is an example in which the stirring force coefficient does not satisfy expression (a), Comparative Examples 5 and 6 are examples in which the temperatures of the water-absorbent resins are as high as 160° C., and Comparative Example 7 is an example in which the droplet diameter is as large as 4 mm.

Comparative Examples 8 to 11 are examples in each of which the specific surface area of the water-absorbent resin having been used is as high as 29 $m^2$/kg. With the specific surface area of the water-absorbent resin being high, the Vortex-method-based water absorption time was as short as 33 seconds. Meanwhile, with the droplet diameter, the stirring force coefficient, and the temperature of the water-absorbent resin being outside the ranges in the claims of the present application, the residual monomer variation rate indicating the variation in the residual monomer among particle sizes were larger than 20.

Specifically, Comparative Example 8 is an example in which: the droplet diameter is as large as 4 mm; and the stirring force coefficient does not satisfy expression (a). In Comparative Example 8, many aggregated coarse particles, i.e., 2.2% of aggregated coarse particles, were generated. Further, the residual monomer variation rate was 21.0, i.e., the variation in the residual monomer among particle sizes was large. In addition, in Comparative Example 8, the water absorption time was short, and the majority of the sulfur-containing reducing agent having been added was taken into a water absorbent agent (aggregate) having a particle diameter not smaller than 850 μm. Consequently, 0.3% by mass of the sulfur-containing reducing agent was detected in a water absorbent agent having a particle diameter not smaller than 500 μm and smaller than 850 μm, and no sulfur-containing reducing agent was detected in a water absorbent agent having a particle diameter smaller than 500 μm.

Comparative Example 9 is an example in which: the droplet diameter is as large as 4 mm; and the temperature of the water-absorbent resin is as high as 160° C. In Comparative Example 9, many aggregated coarse particles, i.e., 3.4% of aggregated coarse particles, were generated. Further, the residual monomer variation rate was 23.2, i.e., the variation in the residual monomer among particle sizes was large. In Comparative Example 9 as well, the water absorption time was short, and the majority of the sulfur-containing reducing agent having been added was taken into a water absorbent agent (aggregate) having a particle diameter not smaller than 850 μm. Consequently, no sulfur-containing reducing agent was detected in a water absorbent agent having a particle diameter smaller than 850 Jim.

Comparative Example 10 is an example in which the droplet diameter is as large as 3 mm. In Comparative Example 10, even though the stirring force coefficient satisfied expression (a), it was impossible to perform appropriate stirring-mixing. As a result, the sulfur-containing reducing agent dispersity was 29.1, and the monomer variation rate was 20.7, i.e., variations in the reducing agent content and the residual monomer content among particle sizes were large. Further, many aggregated coarse particles, i.e., 1.8% of aggregated coarse particles, were also generated.

Comparative Example 11 is an example in which the stirring coefficient does not satisfy expression (a). In Comparative Example 11, it was impossible to perform appropriate stirring-mixing. As a result, the sulfur-containing reducing agent dispersity was 35.0, and the monomer variation rate was 22.5, i.e., variations in the reducing agent content and the residual monomer content among particle sizes were large. Further, many aggregated coarse particles were also generated.

In each of Comparative Example 12 and Comparative Example 13, the heating temperature after the sulfur-containing reducing agent aqueous solution was added to and mixed with the water-absorbent resin was as low as room temperature or 35° C. Thus, the surface of the water-absorbent resin was in a humidified state and had a high viscosity even after heating, whereby no water absorbent agent was obtained.

In Comparative Example 14, the heating temperature after the sulfur-containing reducing agent aqueous solution was mixed was as high as 200° C. Thus, sulfur oxide was generated and malodor was strong, whereby the water absorbent agent was unusable as a product.

In Comparative Example 15, the liquid temperature of the sulfur-containing reducing agent aqueous solution was as high as 90° C. Thus, a malfunction occurred in the adding device in the middle of adding the aqueous solution to the water-absorbent resin, whereby the aqueous solution failed to be completely added.

CONCLUSION

From the above comparison between the examples and the comparative examples, it is found that satisfaction of the conditions regarding "the specific surface area of the water-absorbent resin", "the droplet diameter and the temperature at the time of mixing", "a stirring force coefficient satisfying expression (a)", and "the heating temperature after the sulfur-containing reducing agent aqueous solution is mixed" is important in order to solve the problem of the present application.

The present invention provides a novel water absorbent agent that achieves both a high specific surface area not lower than 25 $m^2$/kg and a low sulfur-containing reducing agent dispersity as well as a low residual monomer variation rate. It is noted that the above Patent Literatures 1 to 14 including Patent Literatures 1 to 5 each disclosing reduction in a residual monomer with use of a sulfur-containing reducing agent, do not disclose the above water absorbent agent and the method for producing the same.

The invention claimed is:

1. A water absorbent agent containing a sulfur-containing reducing agent and containing a water-absorbent resin as a main component, wherein the water absorbent agent includes a particle of the water absorbent agent having a particle diameter smaller than 300 μm, a particle of the water absorbent agent having a particle diameter not smaller than 300 μm and smaller than 500 μm, and a particle of the water absorbent agent having a particle diameter not smaller than 500 μm;

the water absorbent agent has a specific surface area not lower than 25 m²/kg;

the water absorbent agent has a sulfur-containing reducing agent dispersity not larger than 28, the sulfur-containing reducing agent dispersity being defined in the following expression (b), (Sulfur-containing reducing agent dispersity)=σ1/(sulfur-containing reducing agent content of water absorbent agent)×100    (b)

here, a particle size distribution is defined by a sieve classification

σ1: a standard deviation among the following A1, A2, and A3,

A1: a sulfur-containing reducing agent content (unit: % by mass) of the particle that are not smaller than 500 μm out of the particles forming the water absorbent agent, A2: a sulfur-containing reducing agent content (unit: % by mass) of the particle that is not smaller than 300 μm and smaller than 500 μm out of the particles forming the water absorbent agent, and A3: a sulfur-containing reducing agent content (unit: % by mass) of the particle that is smaller than 300 μm out of the particles forming the water absorbent agent.

2. The water absorbent agent according to claim 1, wherein the form of the water absorbent agent is an indefinite pulverized form.

3. The water absorbent agent according to claim 1, wherein a content of the sulfur-containing reducing agent of the water absorbent agent is higher than 0% by mass and not higher than 1% by mass.

4. The water absorbent agent according to claim 1, wherein a content of a residual monomer of the water absorbent agent with respect to the entire amount of the water absorbent agent is not higher than 500 ppm.

5. The water absorbent agent according to claim 1, wherein a Vortex-method-based water absorption time of the water absorbent agent is longer than 10 seconds and not longer than 45 seconds.

6. The water absorbent agent according to claim 1, wherein the water absorbent agent has not lower than 20 g/g of the absorption capacity under load AAP under a load of 4.83 kPa.

7. The water absorbent agent according to claim 1, wherein a moisture content of the water absorbent agent is higher than 0% by mass and not higher than 10% by mass.

8. The water absorbent agent according to claim 1, wherein a residual monomer variation rate of the water absorbent agent is not larger than 20 defined by the following expression (c), (Residual monomer variation rate)=σ2/(residual monomer content of water absorbent agent)×100    expression (c)

here,

σ2: a standard deviation among the following B1, B2, and B3,

B1: a residual monomer content (unit: ppm) of the particle that are not smaller than 500 μm out of the particles forming the water absorbent agent, B2: a residual monomer content (unit: ppm) of the particle that are smaller than 500 μm and not smaller than 300 μm out of the particles forming the water absorbent agent, and B3: a residual monomer content (unit: ppm) of the particle that are smaller than 300 μm out of the particles forming the water absorbent agent.

9. The water absorbent agent according to claim 1, wherein a mass-average particle diameter D50 of the water absorbent agent is not smaller than 250 μm and not larger than 550 μm; and a proportion of the particles smaller than 150 μm is not higher than 3% by mass.

* * * * *